(12) United States Patent
Cummings

(10) Patent No.: US 6,546,261 B1
(45) Date of Patent: Apr. 8, 2003

(54) METHOD AND APPARATUS FOR CONFIGURING COMMUNICATION APPARATUS IN ACCORDANCE WITH COMMUNICATION SERVICES AND PROTOCOLS

(75) Inventor: Mark R. Cummings, Atherton, CA (US)

(73) Assignee: Morphics Technology, Inc., Campbell, CA (US)

( * ) Notice: Subject to any disclaimer, the term of this patent is extended or adjusted under 35 U.S.C. 154(b) by 0 days.

(21) Appl. No.: 08/872,974

(22) Filed: Jun. 10, 1997

Related U.S. Application Data

(60) Provisional application No. 60/022,089, filed on Jun. 10, 1996.

(51) Int. Cl.[7] .................................................. H04Q 7/20
(52) U.S. Cl. ........................................ 455/552; 455/419
(58) Field of Search ................................. 455/403, 422, 455/550, 552–53, 560–561, 507, 575, 418, 419

(56) References Cited

U.S. PATENT DOCUMENTS

| 4,777,646 | A | | 10/1988 | Harris |
| 5,128,981 | A | | 7/1992 | Tsukamoto et al. |
| 5,363,427 | A | | 11/1994 | Ekstrom et al. |
| 5,396,653 | A | * | 3/1995 | Kivari et al. ............ 455/522 X |
| 5,406,615 | A | * | 4/1995 | Miller, II et al. ............ 455/552 |
| 5,448,765 | A | | 9/1995 | Kovanen et al. |
| 5,471,471 | A | * | 11/1995 | Freeburg et al. ......... 455/560 X |
| 5,524,276 | A | | 6/1996 | Littig et al. |
| 5,574,771 | A | | 11/1996 | Driessen et al. |
| 5,655,003 | A | | 8/1997 | Erving et al. |
| 5,771,468 | A | * | 6/1998 | Stein ........................... 455/561 |
| 5,777,991 | A | * | 7/1998 | Adachi et al. ............... 370/352 |

FOREIGN PATENT DOCUMENTS

| EP | 0 695 096 A2 | 1/1996 |
| WO | WO 95/17077 | 6/1995 |

OTHER PUBLICATIONS

Cummings et al., "Mode Switching and Software Download for Software Defined Radio: The SDR Form Approach", IEEE, pp. 104–106 (Aug. 1999).
Mitola, J., "Software Radios Survey, Critical Evaluation and Future Directions", IEEE, pp. 13–15—13–23 (May 1992).
Raciti, R., "Cellular Technology", Cellular Technology Online!, pp. 1–10 (Jul. 1995).

* cited by examiner

*Primary Examiner*—Nay Maung
(74) *Attorney, Agent, or Firm*—Pennie & Edmonds LLP

(57) ABSTRACT

Information can be communicated to or from an electronic device in accordance with a plurality of protocols to provide a plurality of services for the user. The apparatus can operate with any conventional modulation (analog or digital) and in accordance with at least one of the plurality of protocols. If the user is a person, the services can include providing audio or tone signals. If the user is a device, the services can include providing audio, tone, or data signals. The electronic device is a receiver, a transmitter, or transceiver.

9 Claims, 32 Drawing Sheets

FOR 800 MHz OPERATION, HIGH SIDE INJECTION IS USED (1300-500-900)

|  | Originate | Terminate / Standby |
|---|---|---|
| Voice | listen to determine presence of AMPS & PCS 1900, select one | pick one as standard roam on the other |
| Voice / Data | support simultaneous SMS & voice on PCS 1900 | support simultaneous SMS & voice on PCS 1900 |
| Data | Timeshare RAM with voice services | Timeshare RAM with voice services |
| Page |  | simultaneous with all other services |

FIG. 29

METHOD AND APPARATUS FOR CONFIGURING COMMUNICATION APPARATUS IN ACCORDANCE WITH COMMUNICATION SERVICES AND PROTOCOLS

REFERENCE TO PROVISIONAL APPLICATION

This application claims the benefit of the US Provisional Application No. 60/022,089, filed Jun. 10, 1996.

TECHNICAL FIELD

The present invention relates to methods and apparatus for communicating information, and more particularly, to method and apparatus for adapting to changing communications services.

BACKGROUND OF THE INVENTION

Personal communications is on the brink of an unprecedented expansion of its capabilities. With the advent of advanced personal communications services, such as cellular telephone and low earth orbit (LEO) satellite services, this expansion of capabilities also benefits mobile users. Not only does the expansion of capabilities benefit voice communications, but it also benefits data communications, such as might be used with portable computers and other personal data communicators.

A major difficulty with the expansion of services is that a wide variety of different voice and data communications protocols have been proposed. It can be expected that this variety will increase, both world-wide and within a local area. For example, each communications service has its own technical, geographic and feature sets. Technical parameters include frequency(ies), modulation and protocol used, among others. Geographic parameters are dictated by the particular locale. Feature sets describe whether the service is voice, paging, data, or some combination of these.

As a consequence, a given communications device will become less useful as its user attempts to use it in areas that use incompatible services. For example, as people who rely on mobile communications move through a day, they can move in and out of different coverage areas and their communications needs will change constantly. Further, even within a local area, a given communications device will gradually become less useful as its built-in capabilities are rendered out-of-date by newer services.

It is clearly undesirable for the individual to have to carry a different communication device for each communication service. Also, few individuals really want to know the details and peculiarities of each of the available communication service. Most individuals would much rather have seamless service that is simple, convenient and cost-effective for the user.

Therefore, it is advantageous to have a single personal communications device that will reconfigure itself to be compatible with whatever communications service is desired or needed. This is difficult with today's conventional technology.

SUMMARY OF THE INVENTION

In accordance with a first aspect, the invention is an apparatus for using electromagnetic radiation to communicate with a user. The communication is in accordance with any one or more of a plurality of predetermined communications protocols, and in accordance with any one or more of a plurality of predetermined communications services.

The apparatus includes a protocol circuit, a service circuit, and a radio frequency circuit. The protocol circuit establishes the one or more predetermined communications protocols. It also generates a protocol signal representative of the one or more predetermined communications protocols established. The service circuit establishes the one or more predetermined communications services and generates a service signal representative of the one or more predetermined communications services established. The radio frequency circuit receives the protocol signal and the service signal and respond to the protocol signal and the service signal. The radio frequency circuit configures itself to respond to radio frequency signals in compliance with the one or more predetermined communications protocols and the one or more predetermined communications services.

In accordance with another aspect, the invention is a method for using electromagnetic radiation to communicate with a user in accordance with any one or more of a plurality of predetermined communications protocols, and in accordance with any one or more of a plurality of predetermined communications services. The method includes the steps of a) providing a radio frequency circuit, b) establishing the one or more predetermined communications protocols, and c) generating a protocol signal representative of the one or more predetermined communications protocols established. The method further includes the steps of d) establishing the one or more predetermined communications services, e) generating a service signal representative of the one or more predetermined communications services established. In addition, the method includes the steps of f) receiving the protocol signal and the service signal, and g) responding to the protocol signal and the service signal by configuring the radio frequency circuit to respond to radio frequency signals in compliance with the one or more predetermined communications protocols and the one or more predetermined communications services.

In accordance with a further aspect, the invention is an apparatus for using electromagnetic radiation to communicate with a user in accordance with any one or more of a plurality of predetermined communications protocols, and in accordance with any one or more of a plurality of predetermined communications services. The apparatus includes radio frequency circuit means, protocol establishment means, protocol signal means, service establishment means, service signal means, receiver means, and electromagnetic radiation response means. The protocol establishment means is for establishing the one or more predetermined communications protocols, and the protocol signal means is for generating a protocol signal representative of the one or more predetermined communications protocols established. The service establishment means is for establishing the one or more predetermined communications services, and the service signal means is for generating a service signal representative of the one or more predetermined communications services established. The receiver means is for receiving the protocol signal and the service signal. Finally, the electromagnetic radiation response means is for responding to the protocol signal and the service signal by configuring the radio frequency circuit means to respond to radio frequency signals in compliance with the one or more predetermined communications protocols and the one or more predetermined communications services.

BRIEF DESCRIPTION OF THE DRAWINGS

FIG. 29 is a table showing anticipated modes of operation of the first, second, third, fourth and fifth preferrred embodiments of the invention.

FIGS. 1–29 present graphic descriptions of the five preferred embodiments of the invention which, when combined with the following description of the preferred embodiments will be understood by those skilled in the communication electronics and microelectronics arts.

DESCRIPTION OF THE PREFERRED EMBODIMENTS OF THE INVENTION

Figure 1A:
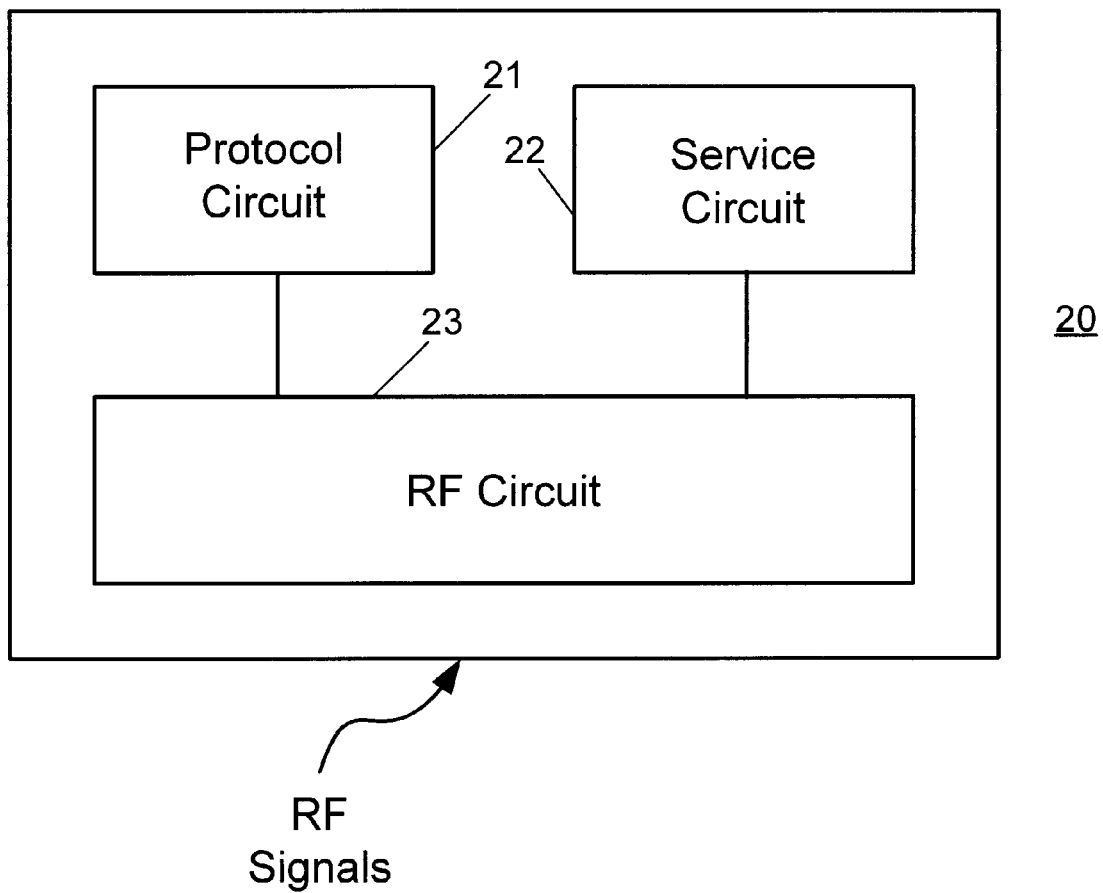
FIG. 1A is a block diagram of a first embodiment of the invention.

FIG. 1A is a block diagram of illustrative apparatus 20 for practicing the invention. The apparatus includes a protocol circuit 21, a service circuit 22, and a radio frequency circuit 23. The protocol circuit 21 establishes one or more predetermined communications protocols. It also generates a protocol signal representative of the one or more predetermined communications protocols established. The service circuit 22 establishes one or more predetermined communications services and generates a service signal representative of the one or more predetermined communications services established. The radio frequency circuit 23 receives the protocol signal and the service signal and responds to the protocol signal and the service signal. The radio frequency circuit configures itself to respond to radio frequency signals in compliance with the one or more predetermined communications protocols and the one or more predetermined communications services.

Figure 1B:
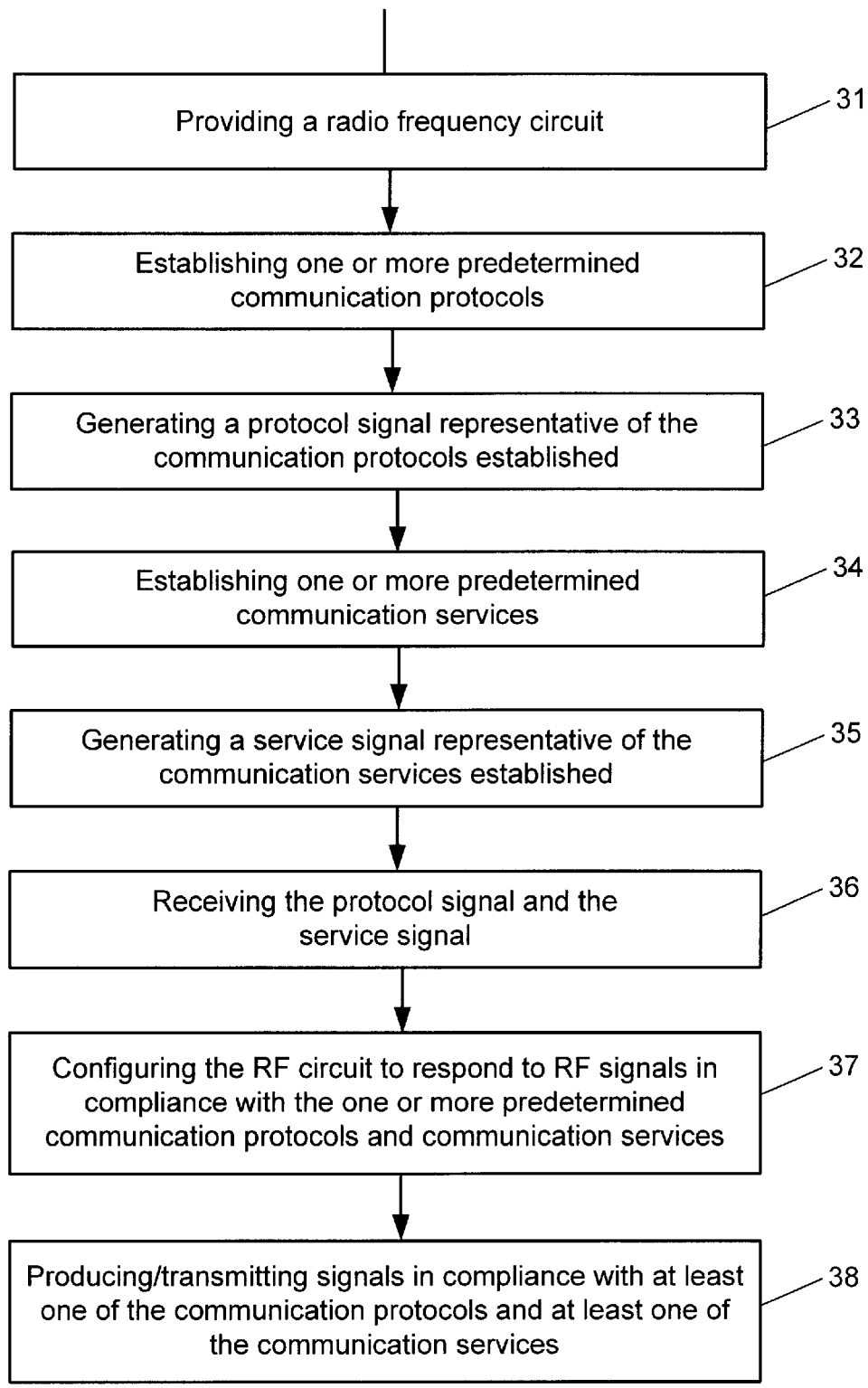
FIG. 1B is a flow chart illustrating a method of practicing the invention.

In accordance with another aspect, the invention is a method for using electromagnetic radiation to communicate with a user in accordance with any one or more of a plurality of predetermined communications protocols, and in accordance with any one or more of a plurality of predetermined communications services. As shown in FIG. 1B, the method includes the steps of a) providing a radio frequency circuit 31, b) establishing the one or more predetermined communications protocols 32, and c) generating a protocol signal representative of the one or more predetermined communications protocols established 33. The method further includes the steps of d) establishing the one or more predetermined communications services 34, e) generating a service signal representative of the one or more predetermined communications services established 35. In addition, the method includes the steps of f) receiving the protocol signal and the service signal 36, and g) responding to the protocol signal and the service signal by configuring the radio frequency circuit to respond to radio frequency signals in compliance with the one or more predetermined communications protocols and the one or more predetermined communications services 37. Finally, the method may include the step 38 of producing signals or transmitting signals in compliance with at least one of the communication protocols and at least one of the communication services.

Figure 1C:
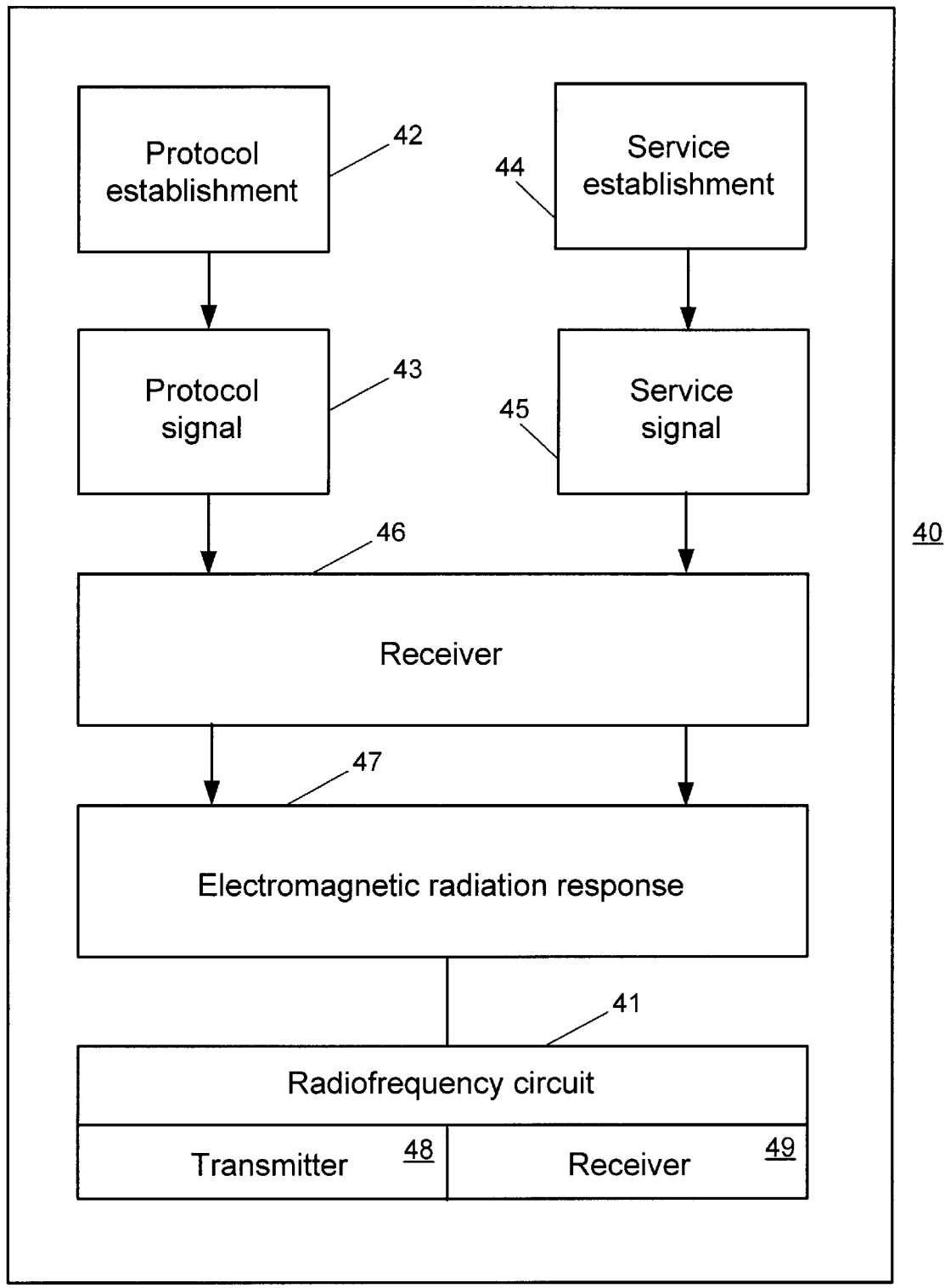
FIG. 1C is a block diagram of a second embodiment of the invention.

In accordance with a further aspect of the invention shown in FIG. 1C, the invention is an apparatus 40 for using electromagnetic radiation to communicate with a user in accordance with any one or more of a plurality of predetermined communications protocols, and in accordance with any one or more of a plurality of predetermined communications services. The apparatus includes radio frequency circuit means 41, protocol establishment means 42, protocol signal means 43, service establishment means 44, service signal means 45, receiver means 46, and electromagnetic radiation response means 47. The radio frequency circumstances illustratively includes a transmitter 48 and a receiver 49. The protocol establishment means 42 is for establishing the one or more predetermined communications protocols, and the protocol signal means is for generating a protocol signal representative of the one or more predetermined communications protocols established. The service establishment means 42 is for establishing the one or more predetermined communications services, and the service signal means is for generating a service signal representative of the one or more predetermined communications services established. The receiver means 46 is for receiving the protocol signal and the service signal. Finally, the electromagnetic radiation response means 47 is for responding to the protocol signal and the service signal by configuring the radio frequency circuit means 41 to respond to radio frequency signals in compliance with the one or more predetermined communications protocols and the one or more predetermined communications services.

Figure 1D:
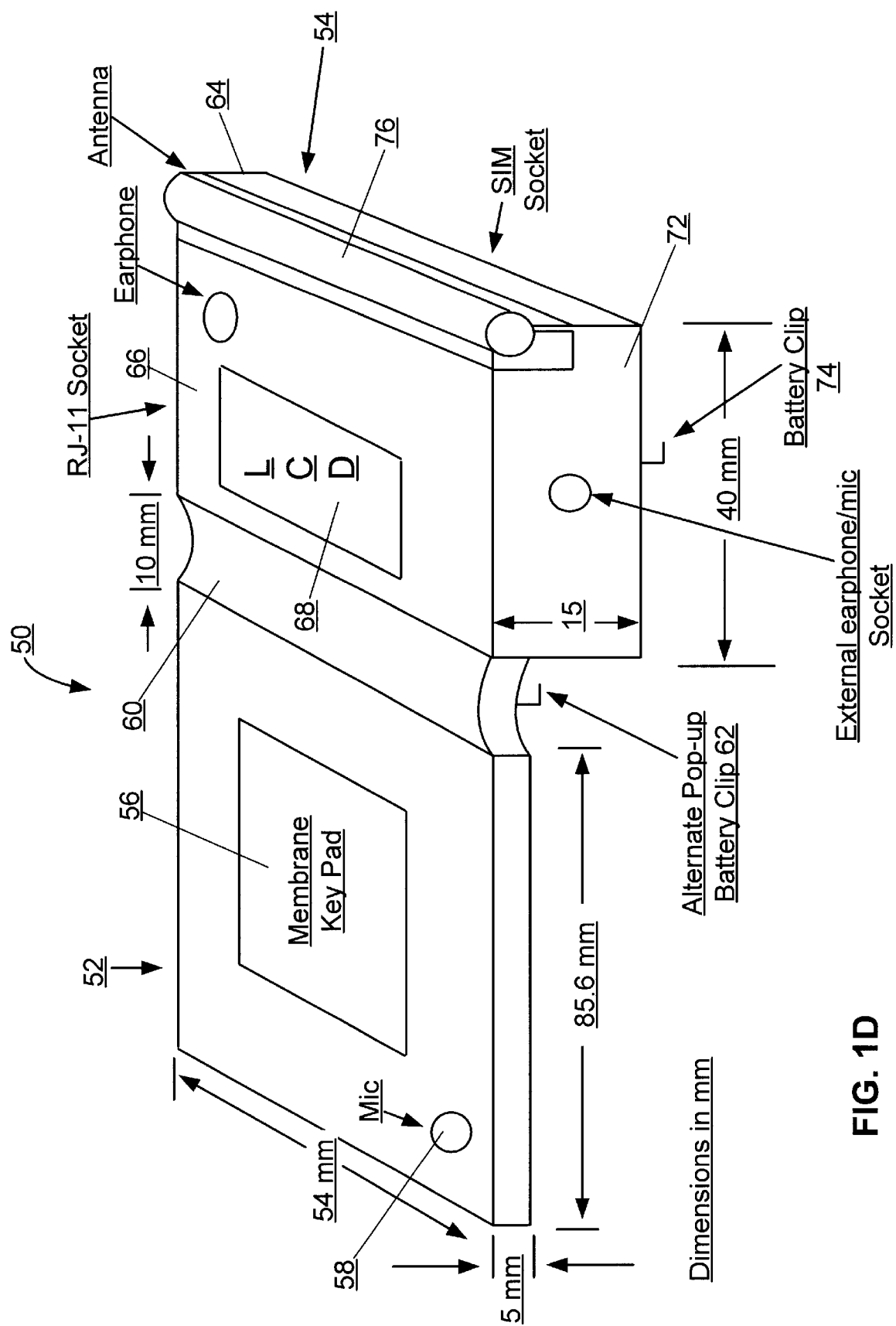
FIG. 1D is a perspective view of a preferred implementation of the various preferred embodiments of the invention.

FIG. 1D is a perspective view of a preferred format of the various preferred embodiments of the invention. An exemplary circuit 50 (assumed to be a transceiver) in the preferred format is generally planar and rectangular in shape, being approximately 54 millimeters wide, approximately 135.6 millimeters in length and 5 millimeters thick. The exemplary circuit 50 includes a key pad portion 52 and a transceiver portion 54. The key pad portion 52 includes a membrane key pad 56 and a microphone 58. Between the key pad portion 52 and the transceiver portion 54 is a portion 60 which includes an alternate pop-up battery clip 62. The transceiver portion 54 includes an enclosure 64 that encloses the circuit for the transceiver. The transceiver portion 54 also includes an upper surface 66 supporting a liquid crystal display (LCD) 68. An earphone socket 70 is located on another side 72 of the transceiver portion 54. A further side (not shown) of the transceiver portion 54 supports an RJ-11 socket for connection to a compatible cord and a bottom side (also not shown) includes a battery clip 74 and a socket for a security identification module (SIM). The transceiver portion 54 also includes an antenna 76.

Figure 2:
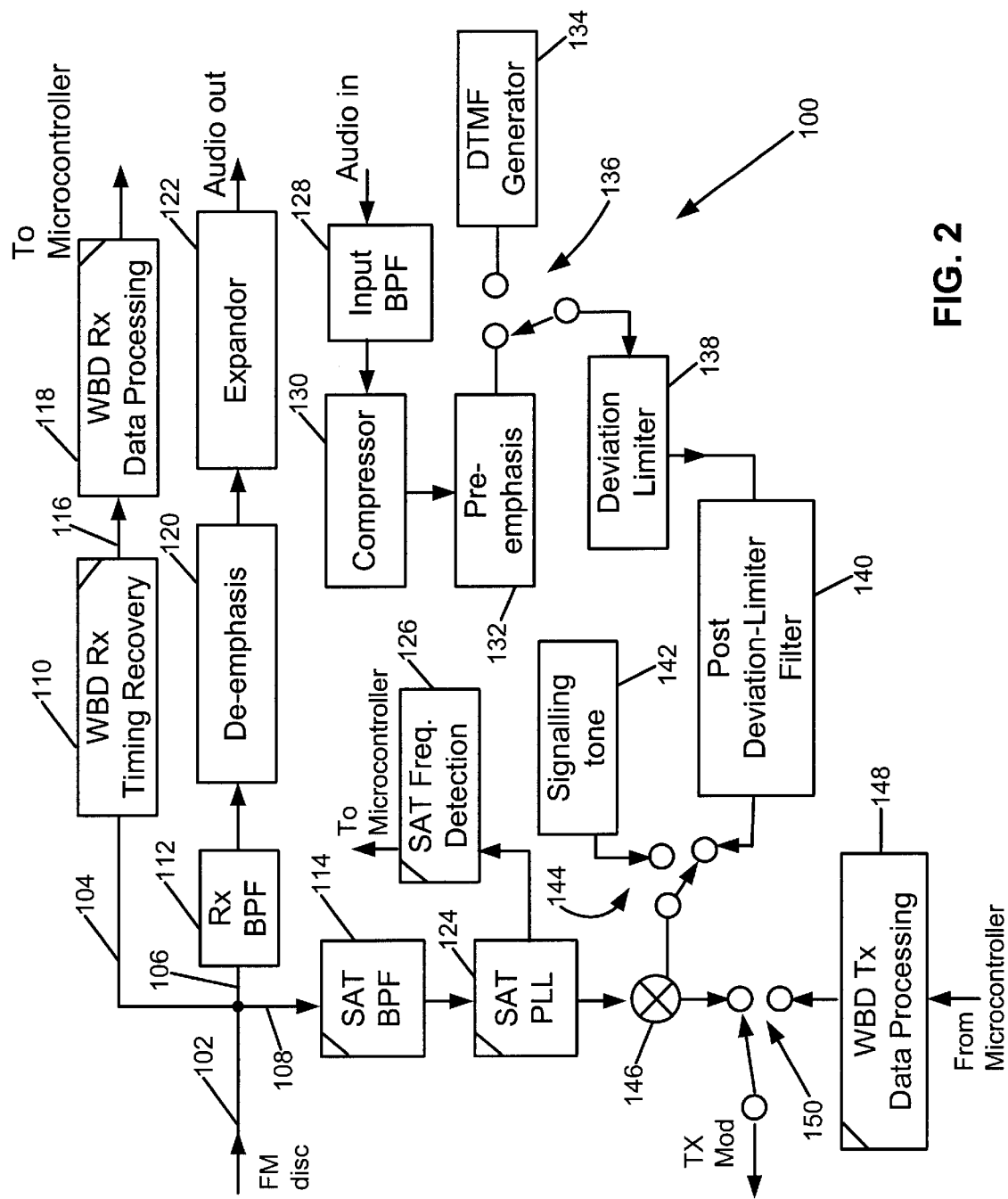
FIG. 2 is a functional block diagram of a first preferred embodiment of the invention.
Figure 3:
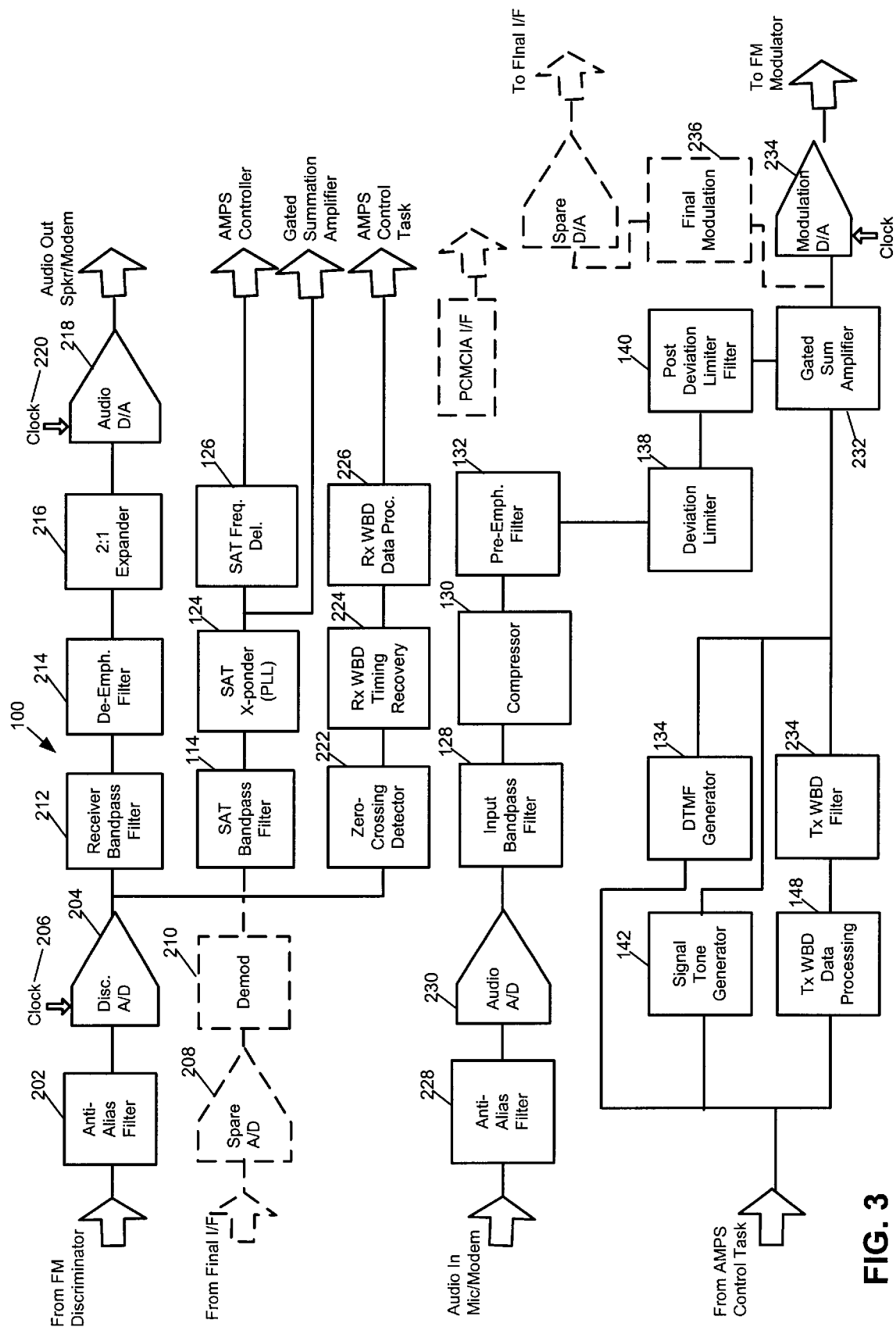
FIG. 3 is a functional distribution diagram of a first preferred embodiment of the invention.

FIG. 2 is a functional block diagram of a first preferred embodiment of the invention, and FIG. 3 is a functional distribution diagram of a first preferred embodiment of the invention. This first preferred embodiment of the invention is a baseband system that is particularly useful with an apparatus that uses frequency modulation in a transmit frequency range of 824–849 MHz and a receive frequency range of 869–894 MHz. The first preferred embodiment has channel spacing of 30 MHz The receiver portion of the first preferred embodiment of the invention has a sensitivity of −116 dBm, and an IF bandwidth of 30 kHz. The first preferred embodiment also has a transmit power of 0.6 Watt (W) and has an analog modem for data support.

As shown in FIG. 2, the first preferred embodiment 100 receives a frequency-discriminated signal from a frequency modulation (FM) discriminator (not shown) on line 102. The frequency-discriminated signal respectively passes on lines 104, 106 and 108 to a wideband receiver timing recovery circuit 110, a receive bandpass filter 112, and an additional bandpass filter 114. The wideband receiver timing recovery circuit 110 produces a timing recovery signal on line 116, which conducts the timing recovery signal to a wideband receive data processing circuit 118. The signal produced by the wideband receive data processing circuit 118 is then sent to a microcontroller (not shown) for further processing. The receive bandpass filter 112 produces a filtered signal that then passes to a conventional de-emphasis circuit 120. An output signal from the receive bandpass filter 112 then passes to an expandor circuit 122, which produces an audio signal for the. user. The bandpass filter 114 produces a signal that is sent to a phase-lock loop 124. The phase-lock loop 124 produces a first signal that is transmitted to a frequency detection circuit 126. The frequency detection circuit 126 is then sent to the microcontroller (not shown) for further processing.

On transmit, an audio in signal is received by an input bandpass filter 128. The filtered signal from the bandpass filter 128 then passes to a compressor circuit 130. The compressed signal from the compressor circuit 130 next passes to a pre-emphasis filter 132. Another source of audio signals is a dual-tone multifrequency (DTMF) generator 134, generally operated by a user activating a keypad (not shown). The audio signal to be transmitted is selected by a switch 136, which then passes to a deviation limiter circuit 138. Thereafter, the deviation limited signal produced by the deviation limiter circuit 138 is transmitted by a post deviation-limiter filter 140. Yet another source of audio signals is a signal tone generator 142. The switch 144 selects either the signal produced by the post deviation-limiter filter 140 or the signaling tone generator 142. The selected signal passes to a mixer 146 where it is mixed with a second output signal of the PLL 124. Another source of an output signal is the microcontroller (not shown) which produces a data signal that is received by a wideband transmit data processing circuit 148. A switch 150 selects either the output of the mixer 146 or the output of the wideband transmit data processing circuit 148. The selected signal to be transmitted is then transmitted to a conventional transmit modulator (not shown).

From another view, the functional distribution diagram of a first preferred embodiment 100 of the invention is shown in FIG. 3. The functional distribution diagram of the first preferred embodiment 100 differs somewhat in detail and purpose from the function block diagram of the first preferred embodiment 100. However, there are some elements of the two figures that are common to the two figures. In this case, common elements are given the same reference numeral in the two figures. As shown in.the function distribution diagram of FIG. 3, in the first embodiment 100, an analog signal is received from an FM discriminator (not shown) and passed through an anti-alias filter 202. The resulting signal is then passed from the anti-alias filter 202 to an analog-to-digital (A/D) circuit 204 which also receives a clock signal 206 from a conventional clock (not shown). Alternatively, if desired, and as will be described subsequently, an analog signal is received by another A/D circuit 208 from a final intermediate frequency (I/F) stage. The digital output from the A/D circuit 208 is then processed by a digital demodulation circuit 210.

Regardless of which alternative is followed, the output signal of the A/D circuit 204 or the digital demodulation circuit 210 is passed simultaneously to three series combinations of functional elements. In one of the combinations, a receiver bandpass filter 212 receives the signal and passes its output to a deemphasis filter 214. The deemphasis filter 214 then passes its output signal to an expander circuit 216 (for example, a 2:1 expander) and the output of the expander circuit 216 then passes to a digital-to-analog (D/A) circuit 218 which also receives a clock signal 220 from a clock (not shown). The digital-to-analog (D/A) circuit 218 operates at an audio frequency. The output of the digital-to-analog (D/A) circuit 218 is then transmitted to a conventional speaker (not shown) or conventional modem (not shown) where the audio frequency information is used.

Along another combination of functional elements, the bandpass filter 114 filters the output signal and transmits the filtered output to the phase-lock loop 124. The output of the phase-lock loop 124 is then sent to a gated summation amplifier (not shown) for use in frequency generation. The output of the phase-lock loop 124 is also sent to a microcontroller (not shown) for further processing.

Along another possible combination of functional elements, a zero-crossing detector 222 processes the output signal and produces a timing signal that is used by a receive wideband timing recovery circuit 224. The receive wideband timing recovery circuit 224 produces an output signal that is then processed by a receive wideband data processing circuit 226 that produces data that can be used by the microcontroller for control purposes.

For transmit purposes, an audio input signal, received from a microphone or modem, is received by an anti-alias filter 228. The output of the anti-alias filter 228 is then passed to an audio A/D circuit 230, where it is digitized. The digital output signal from the audio A/D circuit 230 is next filtered by the input bandpass filter 128. The filtered signal from the bandpass filter 128 then passes to a compressor circuit 130. The compressed signal from the compressor circuit 130 next passes to a pre-emphasis filter 132. The output of the pre-emphasis filter 132 then passes to a deviation limiter circuit 138 and then to a deviation limiter circuit 138. The deviation limited signal produced by the deviation limiter circuit 138 is transmitted by a post deviation-limiter filter 140 to a gated sum amplifier 232.

Another input to the gated sum amplifier 232 is derived by processing a signal from the microcontroller (not shown) to produce an input to a dual-tone multifrequency (DTMF) generator 134. Still another input to the gated sum amplifier 232 is derived by processing a signal from the microcontroller to produce an input to a signal tone generator 142. Yet another input to the gated sum amplifier 232 is derived by processing a signal from the microcontroller through a wideband transmit data processing circuit 148. The output of the wideband transmit data processing circuit 148 then passes to a wideband transmit filter 234.

Regardless of the source of its input signal, the output of the gated sum amplifier 232 passes to a modulation D/A converter 234 which, in turn, passes its output signal to an FM modulator. As another possible use of the embodiment 100, the output of the gated sum amplifier 232 passes to a final modulation device 236 and then to a D/A converter 236. The output of the D/A converter 236 can then be transmitted to the intermediate frequency stage (not shown) of a transmitter.

Figure 4:
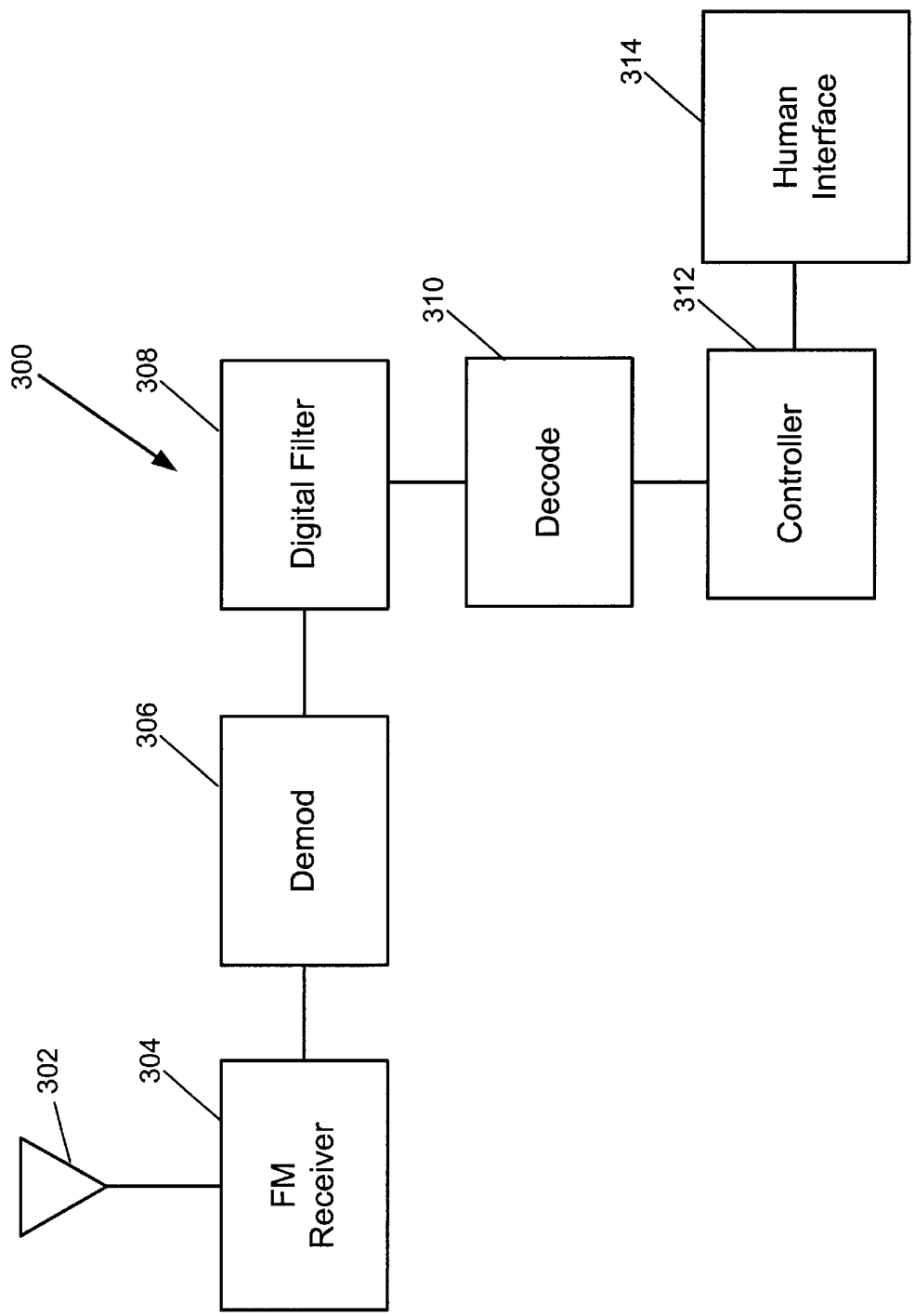
FIG. 4 is a functional block diagram of a second preferred embodiment of the invention.

FIG. 4 is a functional block diagram of a second preferred embodiment of the invention. This second preferred embodiment of the invention is particularly useful with an apparatus that uses frequency shift-keyed modulation in a receive frequency range of 929–932 MHz, with a deviation of ±4800 Hz. The second preferred embodiment has channel spacing of 25 kHz. The data rate for the second preferred embodiment can be selected from 512, 1200 and 2400 bps and features BCH error correction. The data preamble length is 512 bits. The receiver portion of the second preferred embodiment of the invention has a sensitivity of 5 $\mu$V/m at 512 bps, 7 $\mu$V/m at 1200 bps, and 10 $\mu$V/m at 2400 bps, and an IF bandwidth of 25 kHz.

The apparatus 300 of the second preferred embodiment of the invention includes an antenna 302 for receiving electromagnetic signals that are in the appropriate frequency range (s). The signal from the antenna 302 is then processed by an FM receiver 304 whose output is then demodulated by a demodulation circuit 306. The output of the demodulation circuit 306 is processed by a digital filter 308, and the output of the digital filter 308 is then decoded by a decode circuit 310. The decode circuit 310 then produces a control signal that it transmits to a controller 312. The controller 312 processes the control signal and presents appropriate control information to a human interface 314 where it can be used by a human user.

Figure 5:
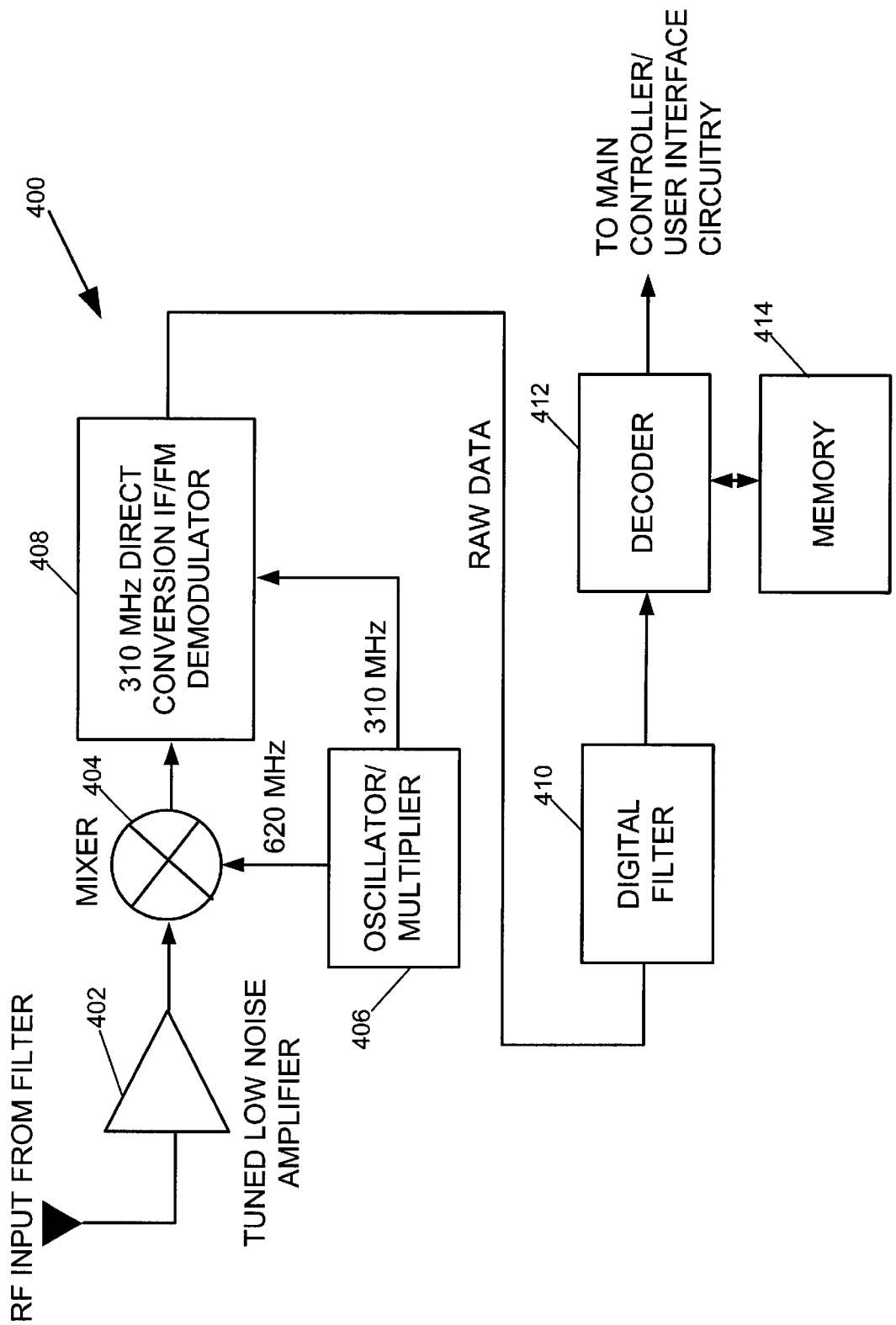
FIG. 5 is a functional distribution diagram of the functional distribution of the second preferred embodiment of the invention.
Figure 6:
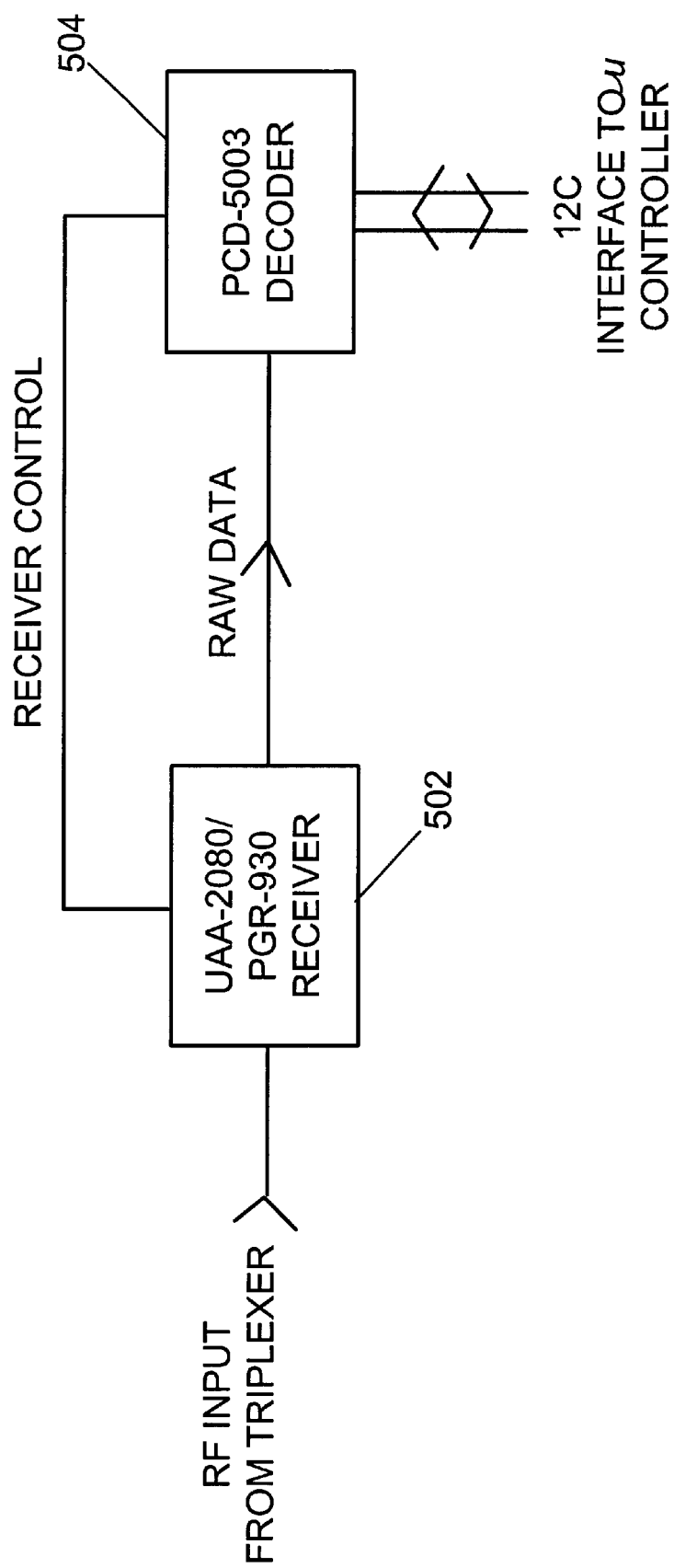
FIG. 6 is a diagram of the architecture of one version of the second preferred embodiment of the invention.

FIG. 5 is a functional distribution diagram of the functional distribution of the second preferred embodiment of the invention, and FIG. 6 is a diagram of the architecture of one version of the second preferred embodiment of the invention. As shown in the function distribution diagram of the second preferred embodiment 400, a filtered radio frequency (RF) signal is received by a tuned low noise amplifier (LNA) 402, whose output is sent to a mixer 404. The mixer 404 has another input and an output. The input of the mixer 404 receives an oscillator signal from an oscillator/multiplier 406. The frequency of the output of the oscillator/multiplier 406 which is transmitted to the mixer 404 is 620 MHz. The output of the mixer 404 is sent to a direct conversion IF/FM demodulator circuit 408. The circuit 408 receives a 310 MHz signal from the oscillator/multiplier 406.

The output of the direct conversion IF/FM demodulator circuit 408 is raw data, which is processed by a digital filter 410 and then by a decoder circuit 412. The decoder circuit 412 communicates with a memory circuit 414 by means of a bi-directional line, allowing the decoder circuit 412 to store and retrieve digital data. The decoder circuit 412 also produces an output signal that can be used by a microcontroller or by user interface circuitry (not shown).

As shown in FIG. 6, the architecture of the second preferred embodiment receives an RF input signal in a receiver 502. The receiver 502 produces a raw data signal which it transmits to a decoder circuit 504. The decoder circuit 504, in turn, produces a feedback control signal which it transmits to the receiver 502. The decoder circuit 504 also transmits and receives interface signals to and from a conventionally programmed microcontroller (not shown).

Figure 7:
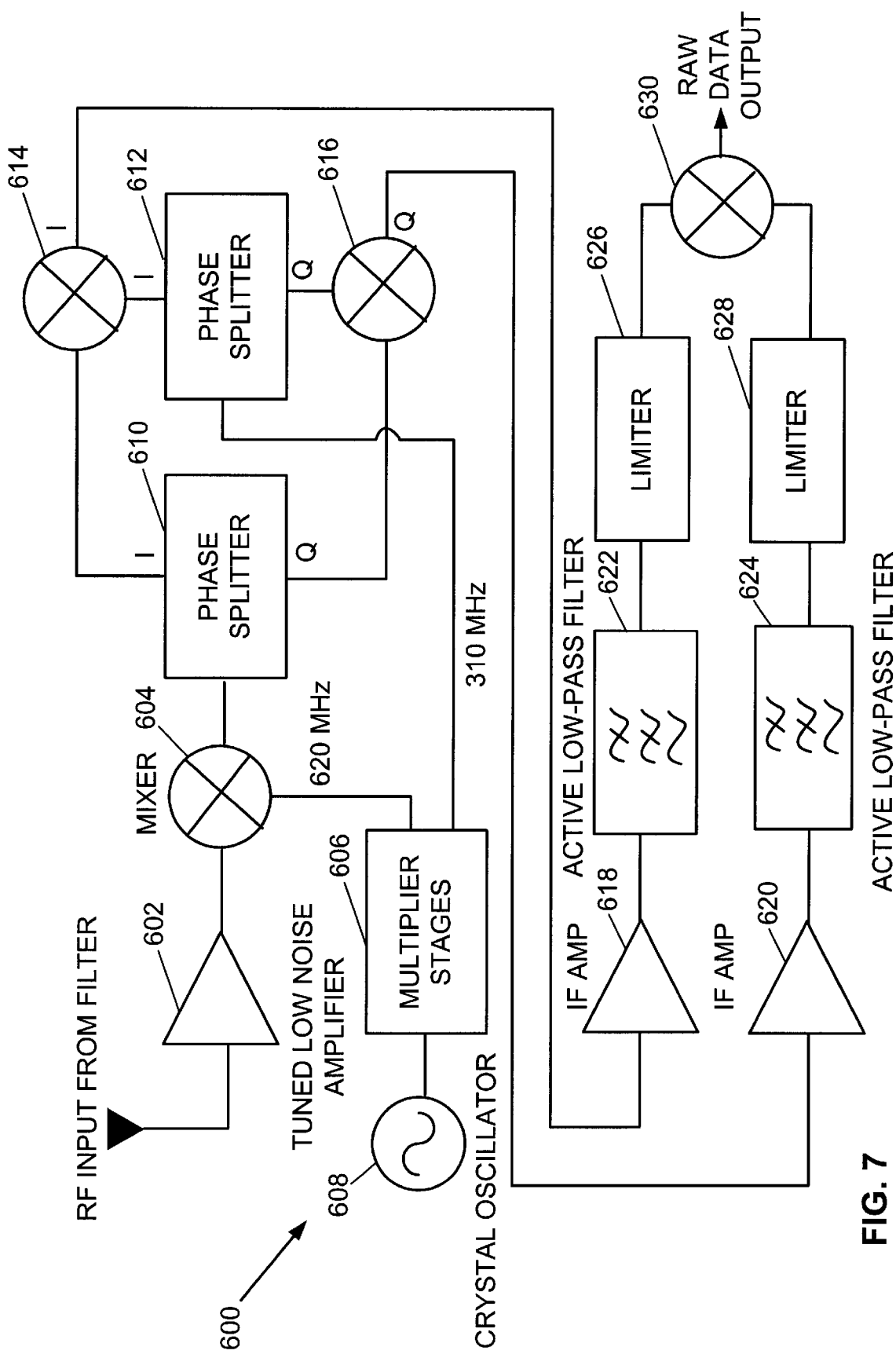
FIG. 7 is a first portion of a diagram of the architectural detail of the one version of the second preferred embodiment of the invention.
Figure 8:
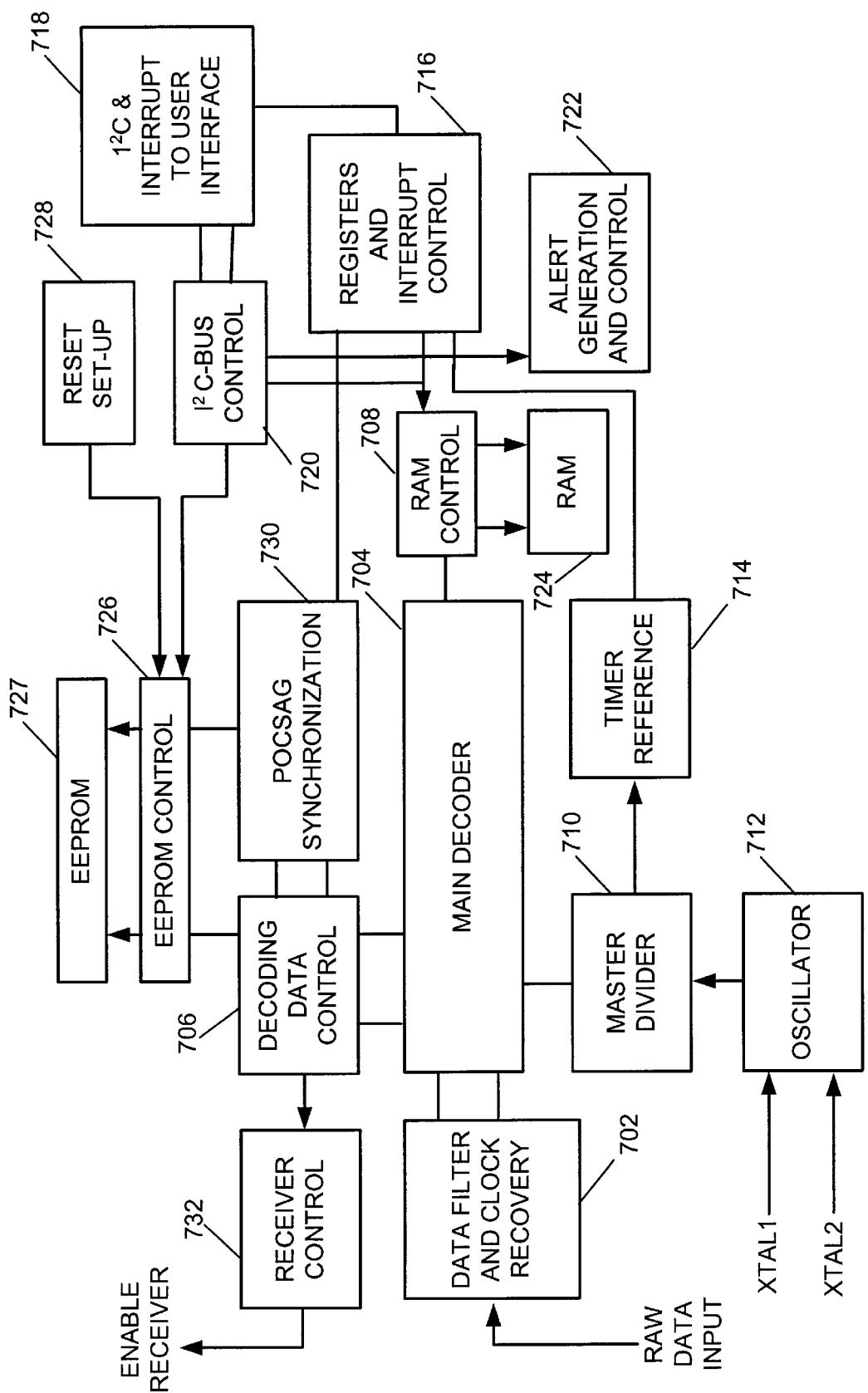
FIG. 8 is a second portion of a diagram of the architectural detail of the one version of the second preferred embodiment of the invention.

FIG. 7 is a first portion of a diagram of the architectural detail of the one version of the second preferred embodiment of the invention, and FIG. 8 is a second portion of a diagram of the architectural detail of the one version of the second preferred embodiment of the invention. This version of the second preferred embodiment of the invention is an analog version.

As shown in FIG. 7, the version of the second preferred embodiment 600 of the invention receives a filtered radio frequency (RF) signal at its tuned low noise amplifier (LNA) 602, whose output is sent to a mixer 604. The mixer 604 has another input and an output. The input of the mixer 604 receives an oscillator signal from a series of multiplier stages 606 that are driven by a crystal oscillator 608. The frequency of the output of the multiplier stages 606 which is transmitted to the mixer 604 is 620 MHz. The output of the mixer 604 is sent to a first phase splitter circuit 610 which produces a direct (I) output and a quadrature (Q) output. The multiplier stages 606 also produce an output signal having a frequency of 310 MHz.

This output signal is sent to a second phase splitter circuit 612 which also produces a direct (I) output and a quadrature (Q) output. The two I output signals are mixed in a mixer 614 and the two Q output signals are mixed in a mixer 616. The outputs of the two mixers 614 and 616 respectively are sent to intermediate frequency amplifiers 618 and 620. The outputs of these two intermediate frequency amplifiers are sent to respective active low-pass filters 622 and 624, after which their outputs are limited in limiters 626 and 628. The outputs of the limiters 626 and 628 are mixed in a mixer 630 to produce raw data output.

In FIG. 8, the raw data input is received by a data filter and clock recovery circuit 702. The circuit 702 communicates with a main decoder 704. The main decoder 704 is also connected to a decoding data controller 706, a RAM controller 708 and a master divider 710. The master divider 710 is driven by a signal from an oscillator 712, which receives an input signal from a first crystal and produces an output signal to drive a second crystal. The master divider also produces an output signal that is sent to a timer reference 714. The output of the timer reference is sent to a register and interrupt control device 716, which sends interrupt signals to a user interface through a control circuit 718 and also to a bus control circuit 720. The control circuit 718 and the bus control circuit 720 also communicate with one another. The bus control circuit 720 also sends interrupt signals to an alert generation and control circuit 722. The register and interrupt control device 716 also send register signals to the RAM controller 708, permitting the RAM control circuit 708 to communicate with a RAM 724. The bus control circuit 720 also sends control signals to an EEPROM controller 726, which controls an electrically-erasable programmable read-only memory (EEPROM) 727 and also receives a reset signal from a reset set-up circuit 728. The EEPROM controller 726 also receives synchronization signals from a POCSAG synchronization circuit 730. The output of the decoding data controller 706 is sent to a receiver control device 732 which enables the receiver to which it is connected.

Figure 9:
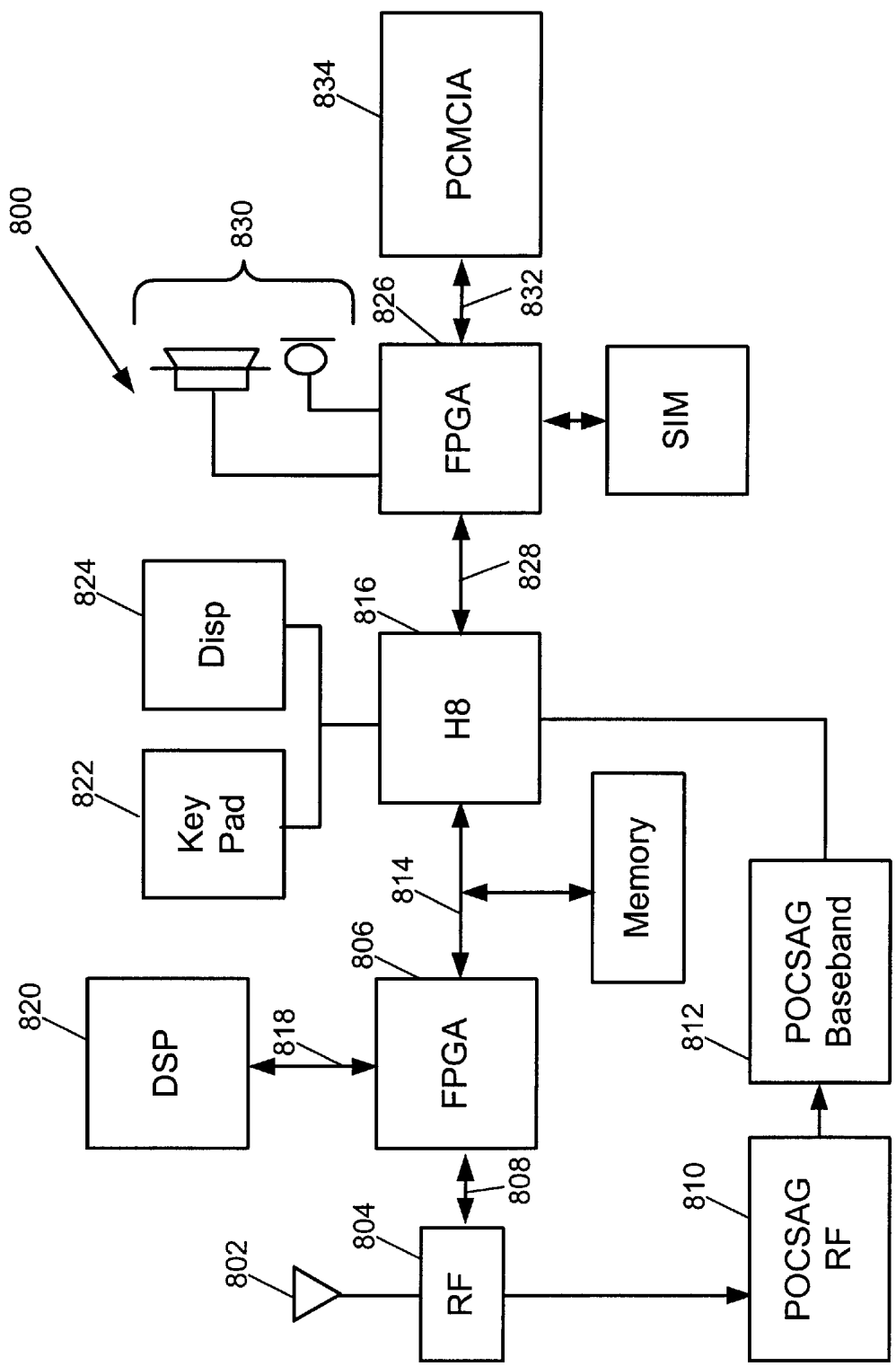
FIG. 9 is a diagram of the architecture of the other version of the second preferred embodiment of the invention.

FIG. 9 is a diagram of the architecture of the other version of the second preferred embodiment of the invention. This version 800 of the second preferred embodiment of the invention is a digital version. Electromagnetic signals received by an antenna 802 are sent to a RF device 804 which communication with a FPGA 806 over a bi-directional link 808. The RF device 804 transmits an output to a POCSAG RF intermediate frequency device 810 which, in turn, transmits its output to a POCSAG baseband device 812. The FPGA 806 communicates over a bi-directional line 814 with a signal processor 816. The FPGA 806 also communicates over a bi-directional line 818 with a digital signal processor (DSP) circuit 820. The signal processor 816 also receives inputs from a keypad 822 and transmits output signals to a display 824. The signal processor 816 further exchanges signals with another configured FPGA 826 over a bi-directional line 828. The other configured FPGA 826 also receives and transmits signals from and to I/O devices 830. The other configured FPGA 826 communicates over a bi-directional line 832 with a PCMCIA port 834, which can be connected to an appropriately equipped device such as a notebook personal computer (PC).

Figure 10:
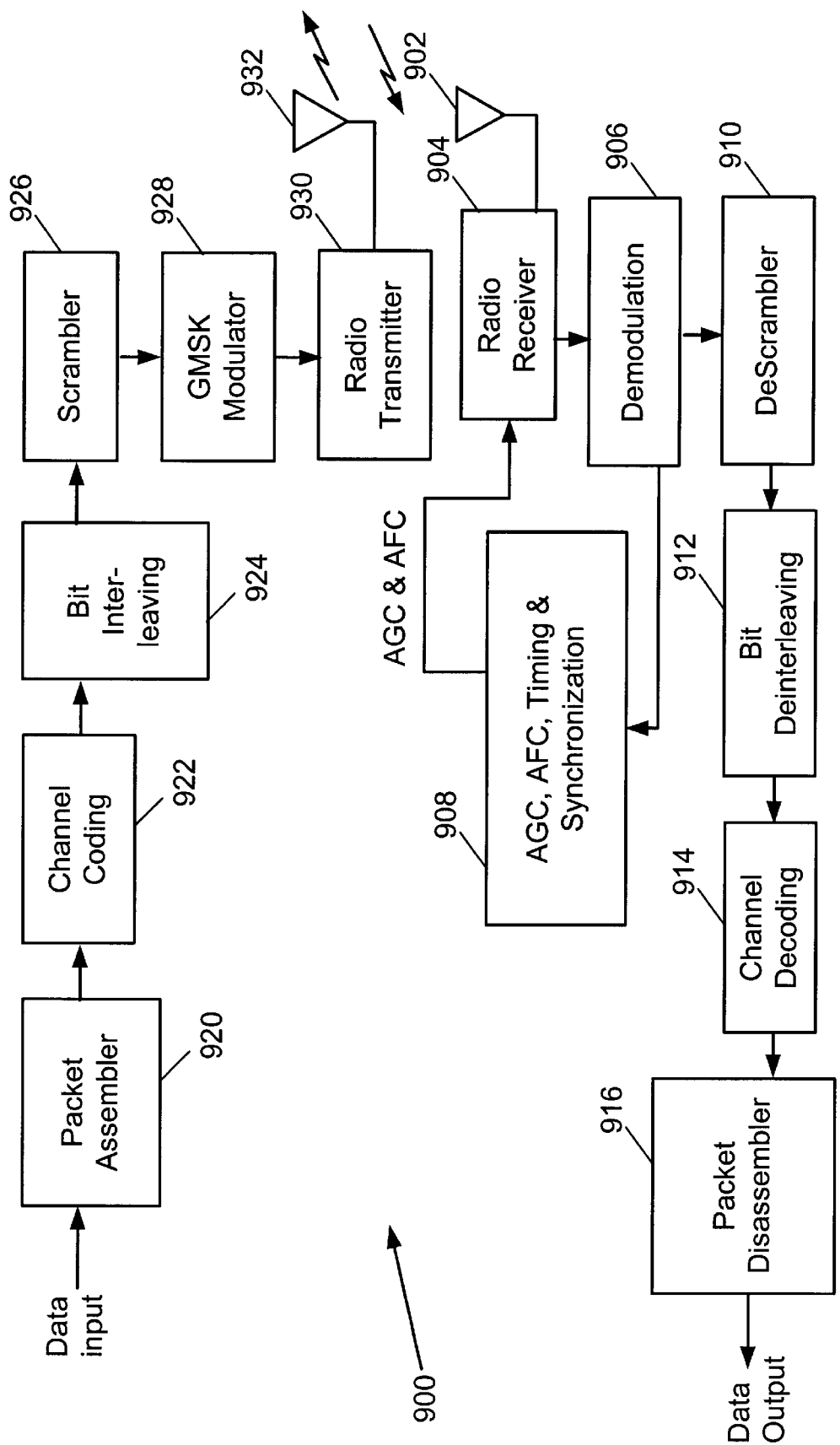
FIG. 10 is a functional distribution diagram of the third preferred embodiment of the invention.
Figure 11:
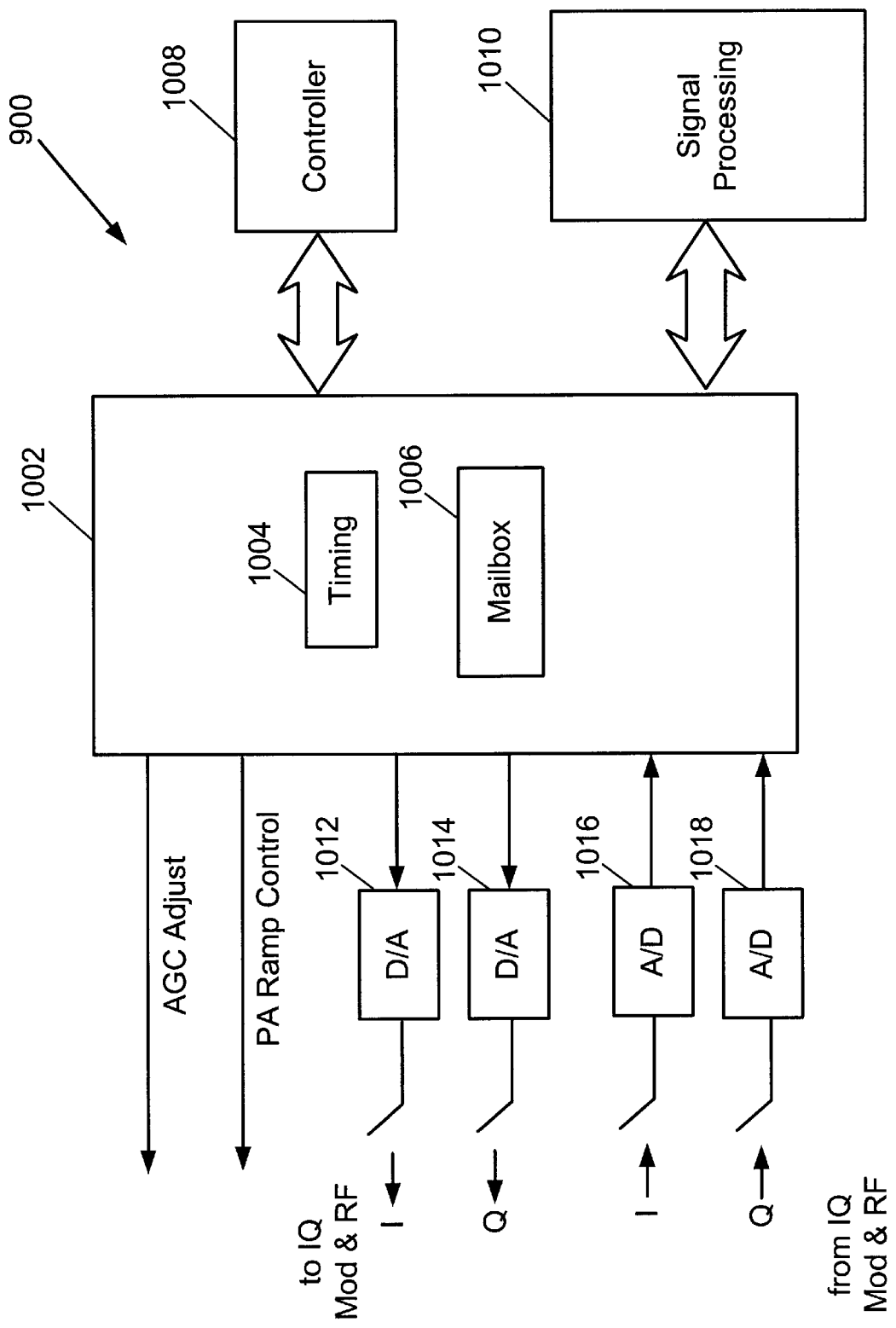
FIG. 11 is a functional block diagram of the third preferred embodiment of the invention.

FIG. 10 is a functional distribution diagram of the third preferred embodiment of the invention, and FIG. 11 is a functional block diagram of the third preferred embodiment of the invention. This third preferred embodiment of the invention is particularly useful with an apparatus that uses GMSK modulation (bandwidth-time product of 0.5) in a receive frequency range of 935–941 MHz and a transmit frequency range of 869–902 MHz. The third preferred embodiment has channel spacing of 12.5 Hz. The raw data rate for the third preferred embodiment is 8 kbps and features a packet transmission format, complying with either the X.25 or HDLC protocols. The maximum packet length is 512 bytes. The receiver portion of the third preferred embodiment of the invention has a sensitivity of −107 dBm. The transmit power for the third preferred embodiment is 0.6 W.

As shown in FIG. 10, the embodiment 900 receives electromagnetic signals from an antenna 902, which transducts the signals and sends them to a radio frequency receiver 904. The receiver 904 sends its output to a demodulator 906. The demodulator 906 is part of a feedback loop including the circuit 908, which provides automatic gain control (AGC), automatic frequency control (AFC), timing and synchronization signals to control the demodulator 906. The demodulator 906 also produces a digital scrambled signal that is sent to a descrambler circuit 910. The output of the descrambler circuit 910 is next transmitted to a bit interleaving circuit 912 to process the digital signal. The processed signals produced by the bit interleaving circuit 912 are sent to a channel decoding circuit 914, and then to a packet disassembler circuit 916, thereby producing the corresponding data output of the signals originally received by the antenna 902.

On transmit, the embodiment 900 receives data input in a packet assembler circuit 920. After assembly, the packets are transmitted to a channel encoder 922 and then bit-interleaved by a circuit 924. The bit-interleaved signals are then scrambled in a scrambler 926, modulated in a GMSK modulator 928 and then sent to a radio frequency transmitter 930 for transmission through the antenna 932.

In the functional view of FIG. 11, the third embodiment 900 includes a digital circuit 1002 that includes timing circuitry 1004 and a mailbox 1006. The digital circuit 1002 is controlled by a controller 1008. The digital circuit 1002 also communicates with a signal processing circuit 1010, which processes particular signal processing tasks. The digital circuit 1002 transmits AGC adjust and other control signals. It further transmits digital signals that are converted to analog signals by D/A devices 1012 and 1014, respectively producing direct and quadrature signals for use by other circuitry. On receive, the digital circuit 1002 receives direct and quadrature signals from other circuitry. The received signals are processed by A/D devices 1016 and 1018 and then sent to the digital circuit 1002 for further processing.

Figure 12:
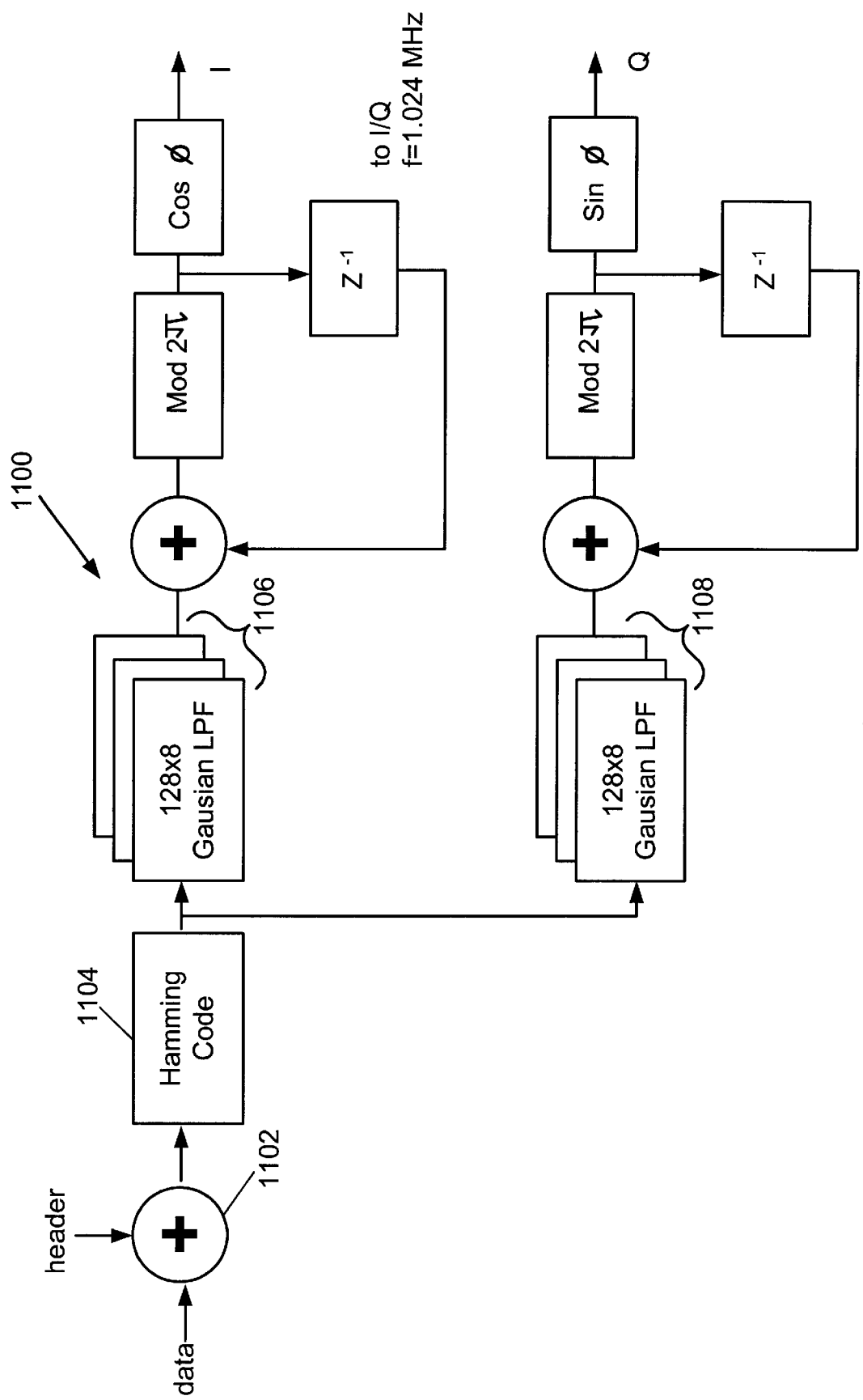
FIG. 12 is a functional block diagram of the transmitter portion of the third preferred embodiment of the invention.
Figure 13:
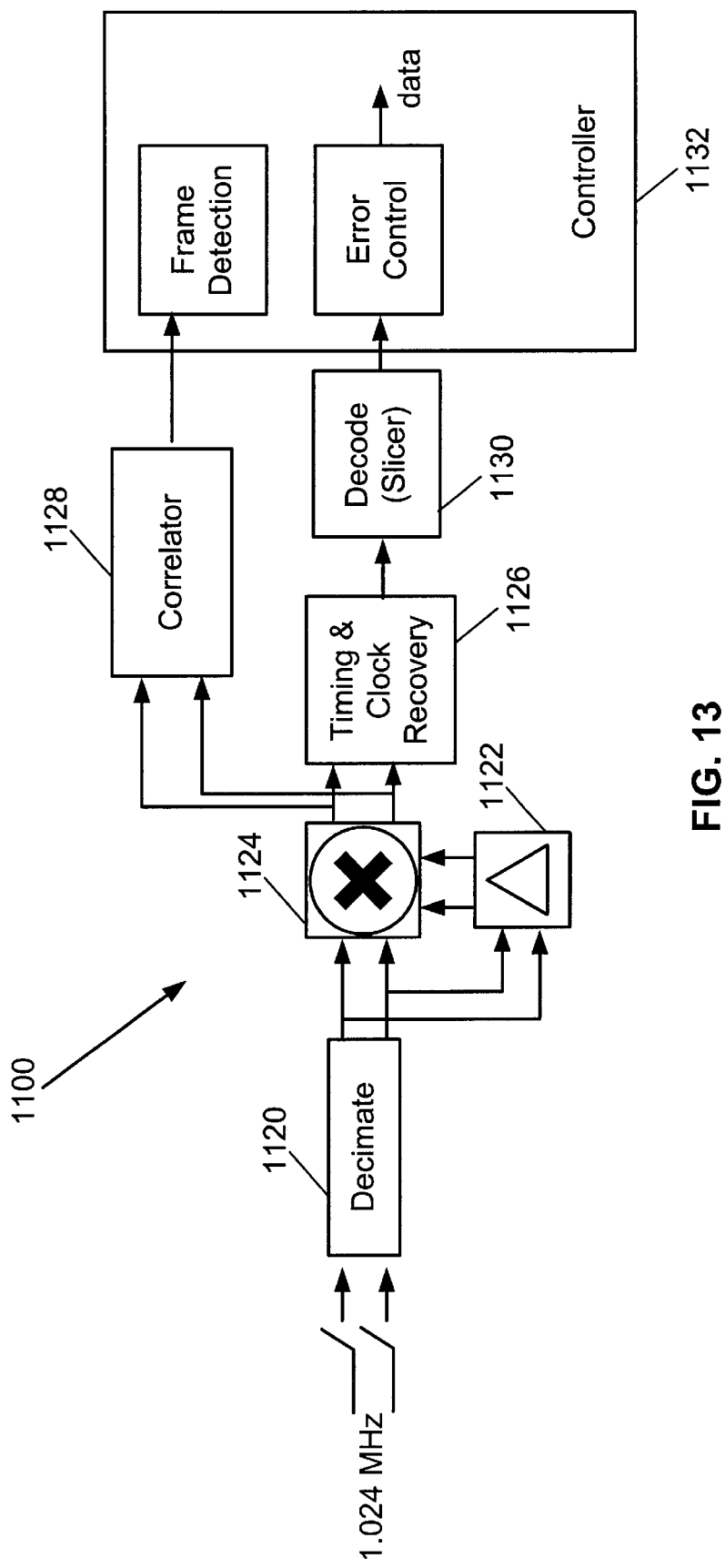
FIG. 13 is a functional distribution diagram of the receiver portion of the third preferred embodiment of the invention.

FIG. 12 is a functional block diagram of the transmitter portion of the third preferred embodiment of the invention, and FIG. 13 is a functional distribution diagram of the receiver portion of the third preferred embodiment of the invention.

As shown in FIG. 12, the third preferred embodiment 1100 receives data to be transmitted and combines it with header information in an adder 1102. The output of the adder 1102 is then encoded in accordance with a Hamming code (in encoding circuit 1104). The encoded data is then passed through two banks of low-pass filters 1106 and 1108. The outputs of the respective banks of low-pass filters are sent to a feed back loop that the outputs to transformed versions of the output to produce output signals. The output signals are produced after their phase is reduced to a 360 degree range, and the fedback signals are produced by transforming the phase information signals. The output signals represent phase shifts and are converted to their direct (real) and quadrature (imaginary) components by trigonometric functions. These components are based on a 1.024 MHz frequency.

As shown in FIG. 13, third preferred embodiment 1100 receives direct and quadrature signals at 1.024 MHz. These signals are then decimated in a decimation circuit 1120. Their differences are determined in the difference circuit 1122. The originally-received signals are mixed with their decimated counterparts to produce output signals from the mixer 1124. The output signals from the mixer 1124 are sent to timing and clock recovery circuitry 1126 and also to a correlator 1128. The output of the timing; and clock recovery circuitry 1126 is decoded by a slicer 1130. A controller 1132 processes the signal output from the correlator 1128 to detect the frames in the originally received digital data. The controller 1132 also processes the output signals from the slicer 1130 and produces error control data therefrom.

Figure 14:
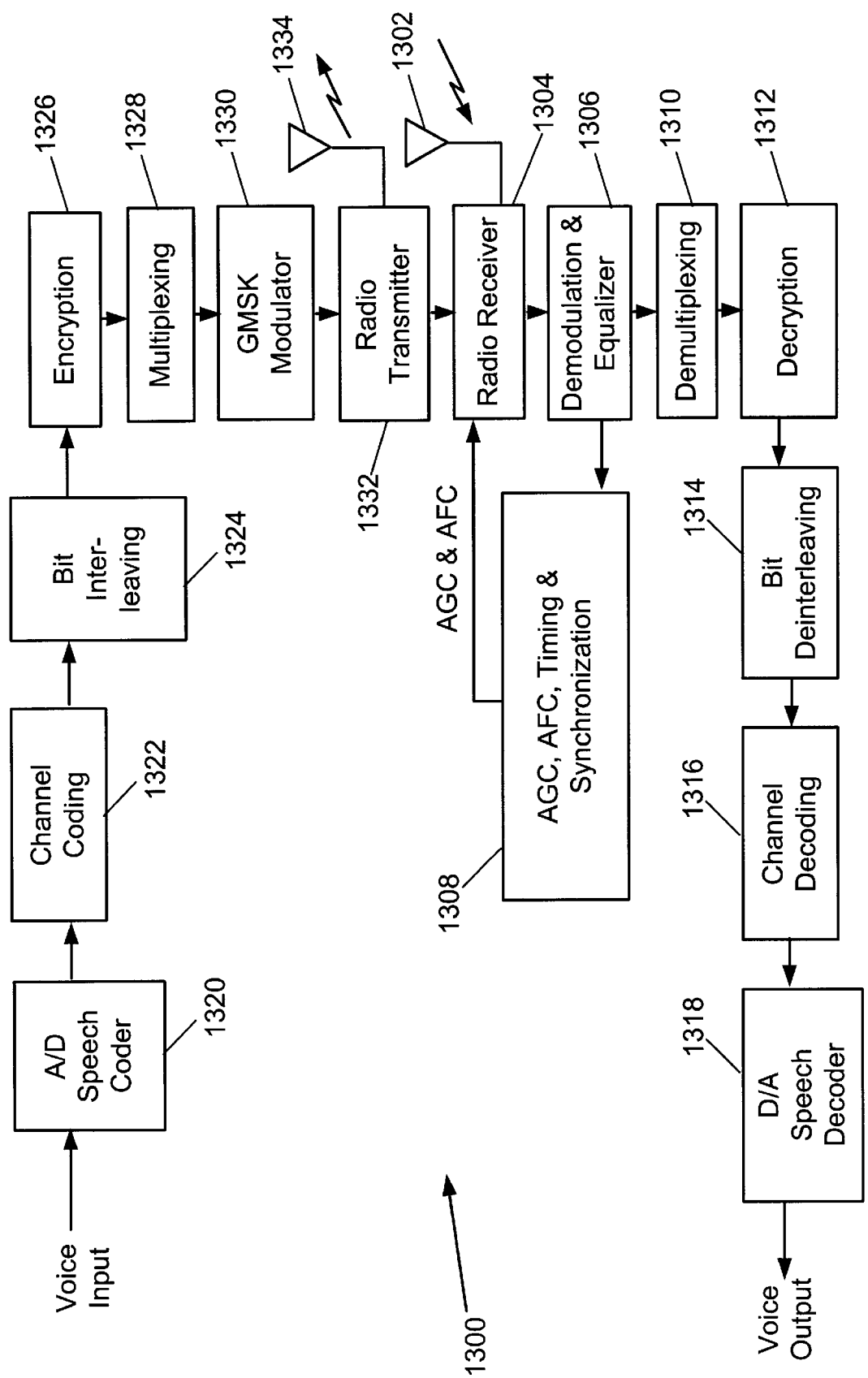
FIG. 14 is a functional block diagram of the fourth preferred embodiment of the invention.
Figure 15:
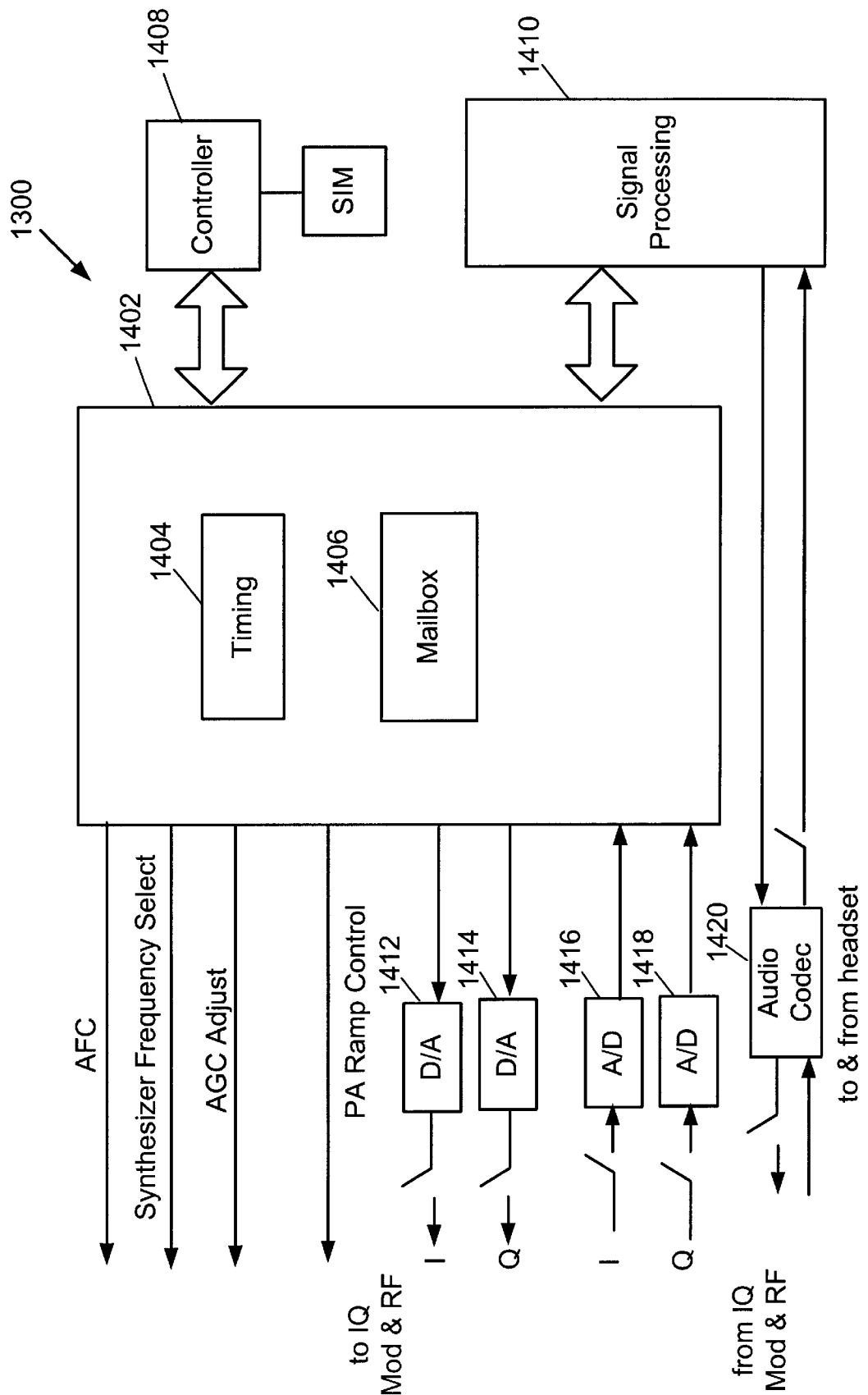
FIG. 15 is a further functional block diagram of the fourth preferred embodiment of the invention.
Figure 16:
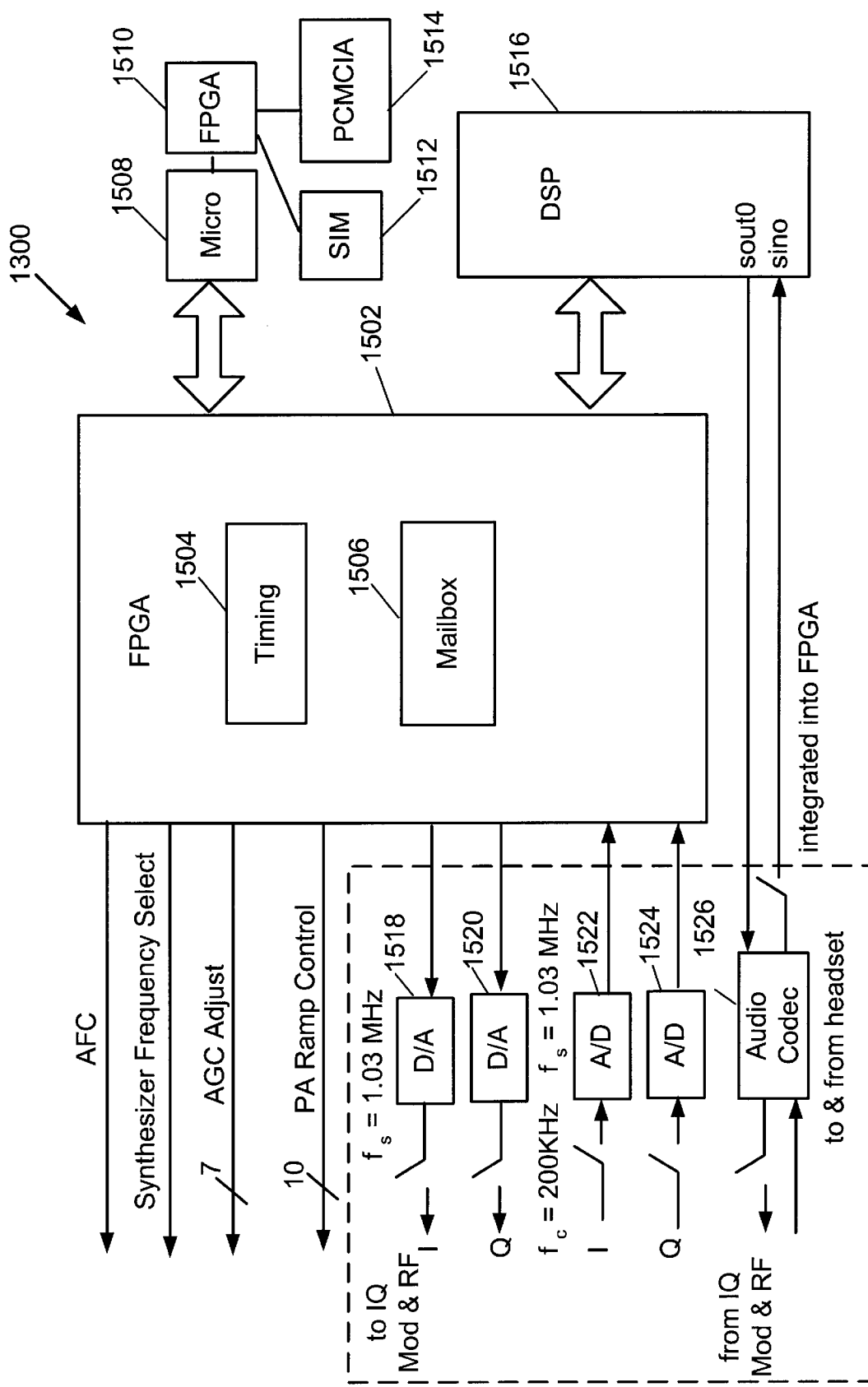
FIG. 16 is a functional distribution diagram of the fourth preferred embodiment of the invention.

FIG. 14 is a functional block diagram of the fourth preferred embodiment of the invention, FIG. 15 is a further functional block diagram of the fourth preferred embodiment of the invention, and FIG. 16 is a functional distribution diagram of the fourth preferred embodiment of the invention.

This fourth preferred embodiment of the invention is particularly useful with an apparatus that uses GMSK modulation (bandwidth-time product of 0.3) in a receive frequency range of 1850–1910 MHz and a transmit frequency range of 1930–1990 MHz. The fourth preferred embodiment has channel spacing and IF bandwidth of 200 kHz, with speech coding of 13 kbps. The raw data rate for the fourth preferred embodiment is 270.833 kbps and features a TDMA transmission format (8 slots). The time slot length is 577 μs and the time frame length is 4.615 μs. The receiver portion of the fourth preferred embodiment of the invention has a sensitivity of −110 dBm. The transmit power for the third preferred embodiment is 0.6 W. The data support rate is 9.6 kbps.

As shown in FIG. 14, the embodiment 1300 receives electromagnetic signals from an antenna 1302, which transducts the signals and sends them to a radio frequency receiver 1304.

The receiver 904 sends its output to a demodulator and equalizer 1306. The demodulator and equalizer 1306 is part of a feedback loop including the circuit 1308, which provides automatic gain control (AGC), automatic frequency control (AFC), timing and synchronization signals to control the demodulator and equalizer 1306. The demodulator and equalizer 1306 also produces a digital scrambled signal that is sent to a demultiplexor circuit 1310.

The output of the demultiplexor circuit 1310 is next sent to a decryption circuit 1312. The output of the decryption circuit 1310 is next transmitted to a bit interleaving circuit 1314 to process the digital signal. The processed signals produced by the bit interleaving circuit 1314 are sent to a channel decoding circuit 1316, and then to a D/A speech decoder circuit 1318, thereby producing the corresponding voice output of the signals originally received by the antenna 1302.

On transmit, the embodiment 1300 receives analog voice input in a A/D speech coder circuit 1320. After coding, the output signals are transmitted to a channel encoder 1322 and then bit-interleaved by a circuit 1324. The bit-interleaved signals are then encrypted in a encrypter 1326, multiplexed in a multiplex 1328, modulated in a GMSK modulator 1330 and then sent to a radio frequency transmitter 1332 for transmission through the antenna 1334.

In the functional view of FIG. 15, the fourth embodiment 1300 includes a digital circuit 1402 that includes timing circuitry 1404 and a mailbox 1406. The digital circuit 1402 is controlled by a controller 1408. The digital circuit 1402 also communicates with a signal processing circuit 1410, which processes particular signal processing tasks. The digital circuit 1402 transmits AFC, AGC adjust and other control signals. It further transmits digital signals that are converted to analog signals by D/A devices 1412 and 1414, respectively producing direct and quadrature signals for use by other circuitry. On receive, the digital circuit 1402 receives direct and quadrature signals from other circuitry. The received signals are processed by A/D devices 1416 and 1418 and then sent to the digital circuit 1402 for further processing. Further, the signal processing circuit 1410 transmits and receives audio signals to and from an audio codec circuit 1420. The audio codec circuit 1420 receives and transmits signals from and to a headset worn by a user of the communication system.

In the functional view of FIG. 16, the fourth embodiment 1300 alternatively includes a digital circuit 1502 (in the form of a FPGA) that includes timing circuitry 1504 and a mailbox 1506. The digital circuit 1502 is controlled by a microcontroller 1508. the microcontroller 1508 receives signals and data from an FPGA 1510 that transmits signals to and from SIM and PCMCIA ports 1512 and 1514, respectively. The digital circuit 1502 also communicates with a digital signal processing circuit 1516, which processes particular signal processing tasks. The digital circuit 1502 transmits AGC adjust and other control signals. It further transmits digital signals that are converted to analog signals by D/A devices 1518 and 1520, respectively producing direct and quadrature signals for use by other circuitry. On receive, the digital circuit 1502 receives direct and quadrature signals from other circuitry. The received signals are processed by A/D devices 1522 and 1524 and then sent to the digital circuit 1502 for further processing. Further, the signal processing circuit 1516 transmits and receives audio signals to and from an audio codec circuit 1526. The audio codec circuit 1526 receives and transmits signals from and to a headset worn by a user of the communication system and can be integrated into an FPGA.

Figure 17:
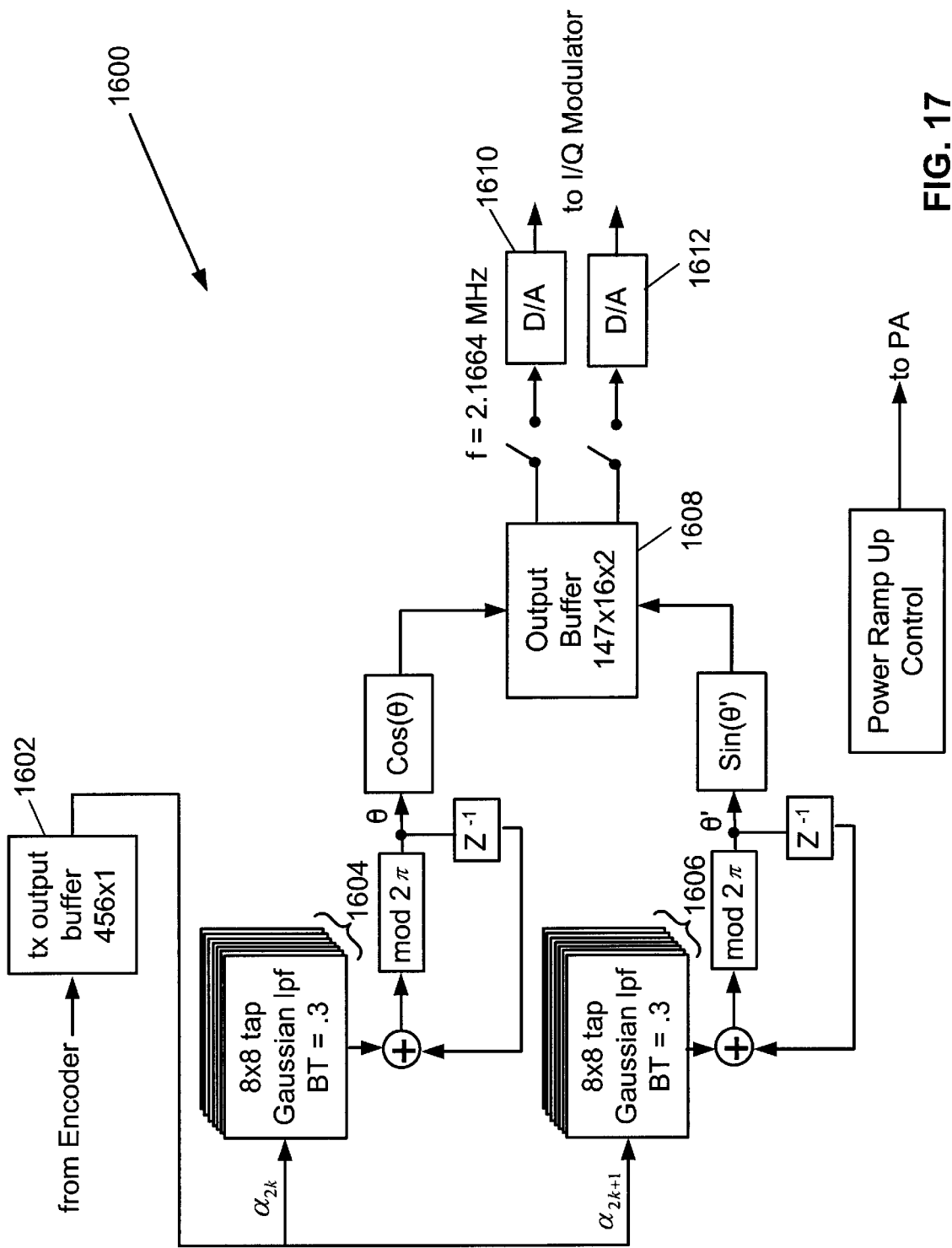
FIG. 17 is a functional distribution diagram of the transmitter portion of a first version of the fourth preferred embodiment of the invention.
Figure 18:
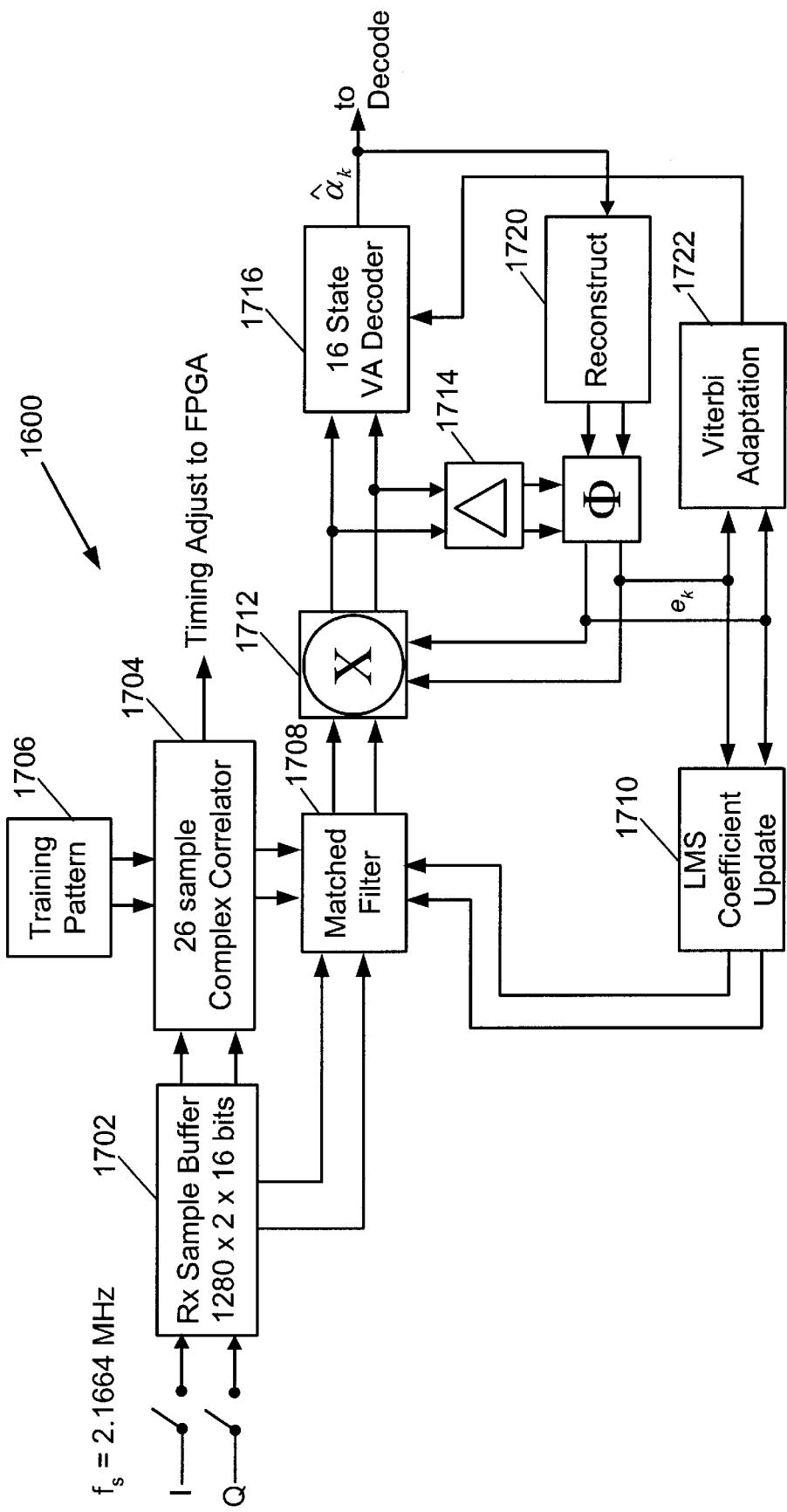
FIG. 18 is a functional distribution diagram of the receiver portion of a first version of the fourth preferred embodiment of the invention.

FIG. 17 is a functional distribution diagram of the transmitter portion of a first version of the fourth preferred embodiment of the invention, and FIG. 18 is a functional distribution diagram of the receiver portion of a first version of the fourth preferred embodiment of the invention.

The first version 1600 of the fourth preferred embodiment of the invention includes a transmit buffer 1602 which receives is digital signals from an encoder (not shown). The outputs of the transmit buffer 1602 are transmitted to two sets of low pass filters 1604 and 1606, respectively. The two sets of low pass filters 1604 and 1606 can take the form of 8 by 8 tap Gaussian low pass filters. The outputs of each of the two sets of low pass filters 1604 and 1606 are sent to a feed back loop that the outputs to transformed versions of the output to produce output signals. The output signals are produced after their phase is reduced to a 360 degree range, and the fedback signals are produced by transforming the phase information signals. The output signals represent phase shifts and are converted to their direct (real) and quadrature (imaginary) components by trigonometric functions. These components are based on a 1.024 MHz frequency. The direct and quadrature components are next transmitted to an output buffer 1608, whose outputs are sampled at 2.1664 MHz to produce digital signals that are converted by two D/A converters 1610 and 1612. The outputs of the two D/A converters 1610 and 1612 are then transmitted to a conventional I/Q modulator.

As shown in FIG. 18, I/Q signals are received by a receiver sample buffer 1702, which is set to receive data at rate of 2.1664 MHz. The outputs from the receiver sample buffer 1702 are then transmitted to a complex correlator 1704, which performs 26 sample correlations, using a training pattern received from a memory 1706. Any timing adjustments are derived from the operation of the complex correlator 1704 on the data. These adjustments are sent to the FPGA for use. A matched filter 1708 receives outputs from the receiver sample buffer 1702, the complex correlator 1.704, and an LMS coefficient update circuit 1710. The output of the matched filter 1708 is sent to a mixer 1712, whose output is sent to a conventional Δ-computation circuit 1714 and a decoder circuit 1716. The output of the decoder circuit 1716 is sent to a decode device (not shown) and also to a reconstruct circuit 1720. The output of the reconstruct circuit 1720 is sent to a phase calculation circuit 1724 and its output is sent to the LMS coefficient update circuit 1710 and to a Viterbi adaptation circuit 1722, as well as to the mixer 1712.

Figure 19:
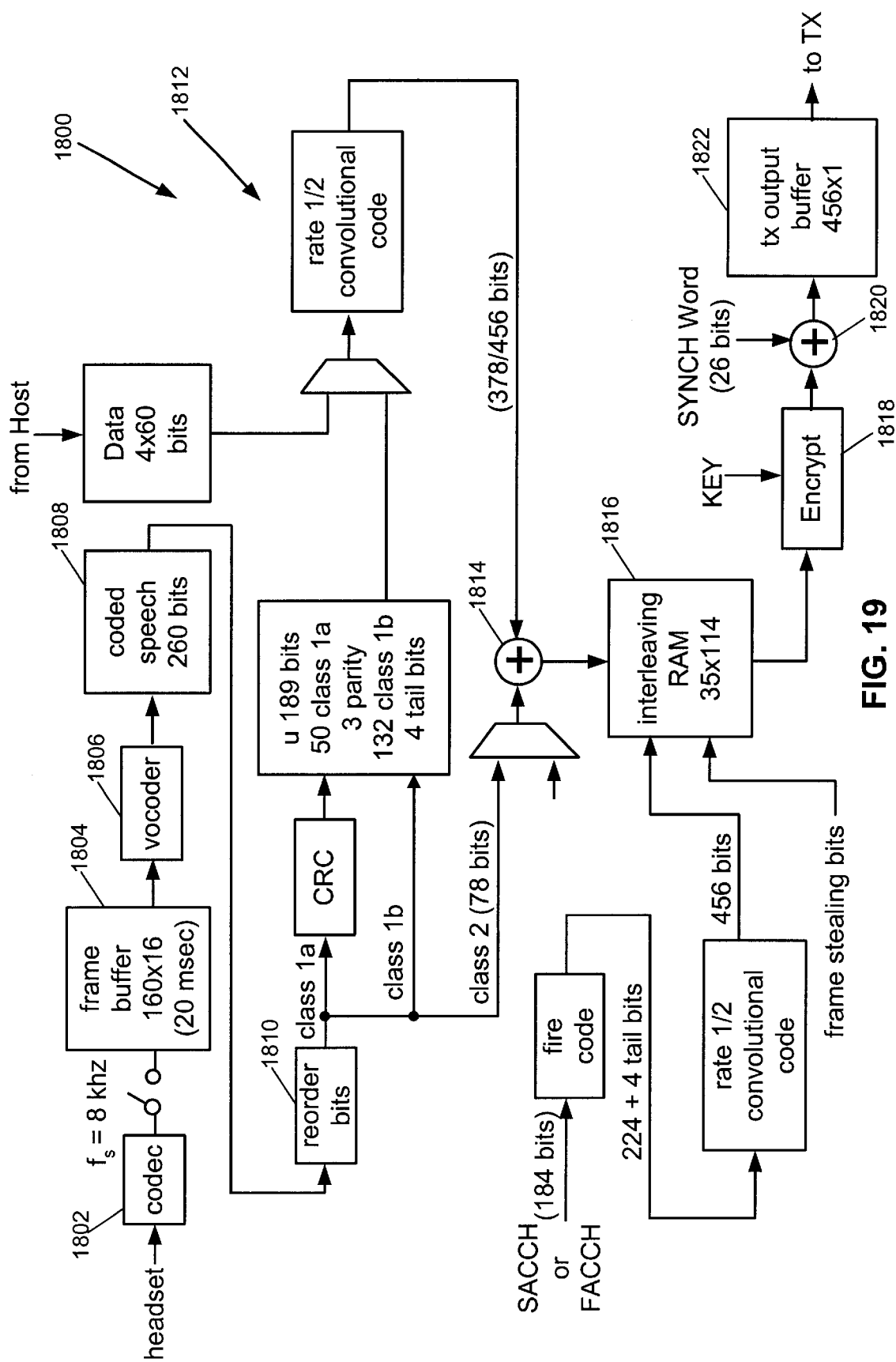
FIG. 19 is a first functional distribution diagram of a second version of the fourth preferred embodiment of the invention.
Figure 20:
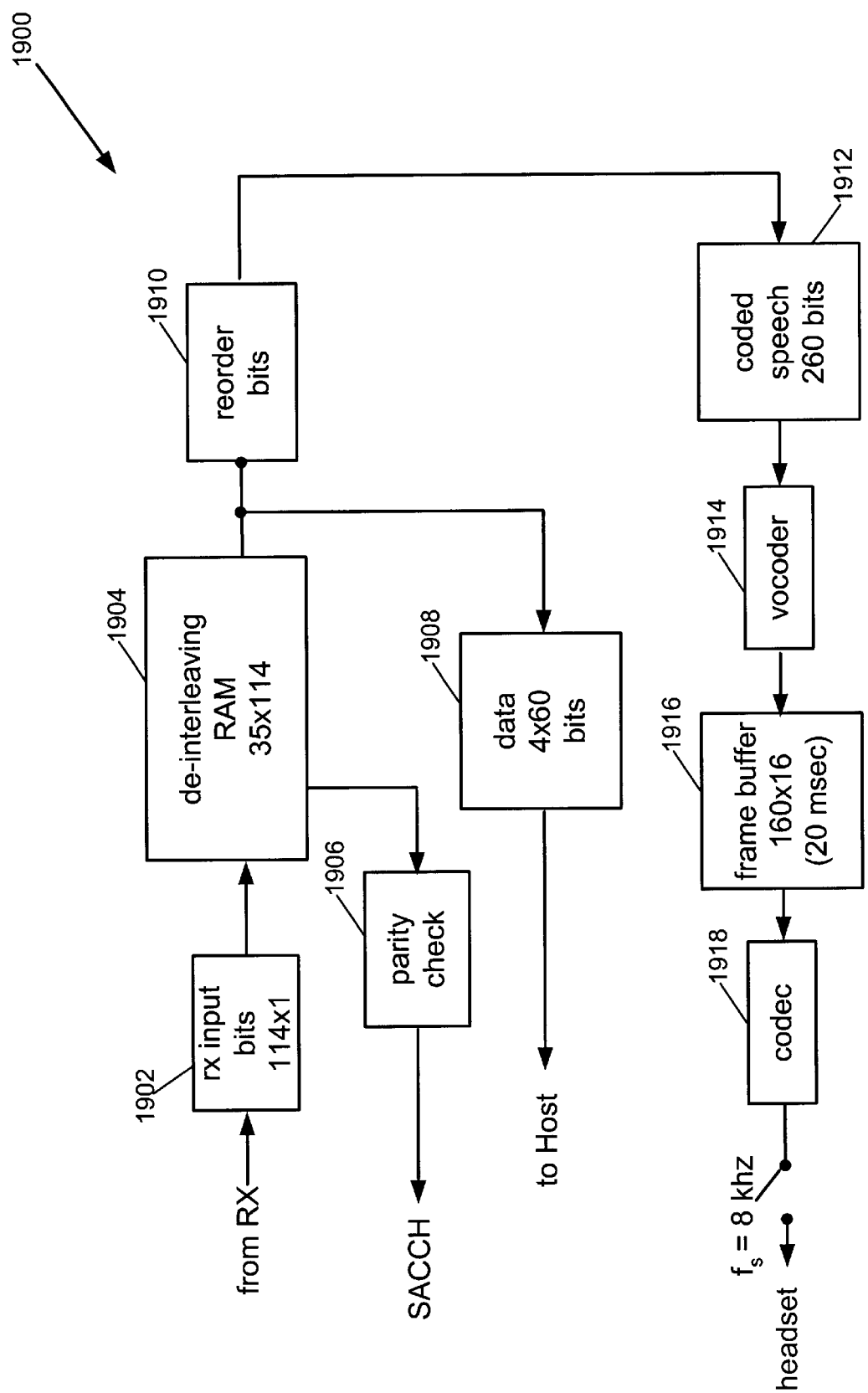
FIG. 20 is a second functional distribution diagram of a second version of the fourth preferred embodiment of the invention.
Figure 21:
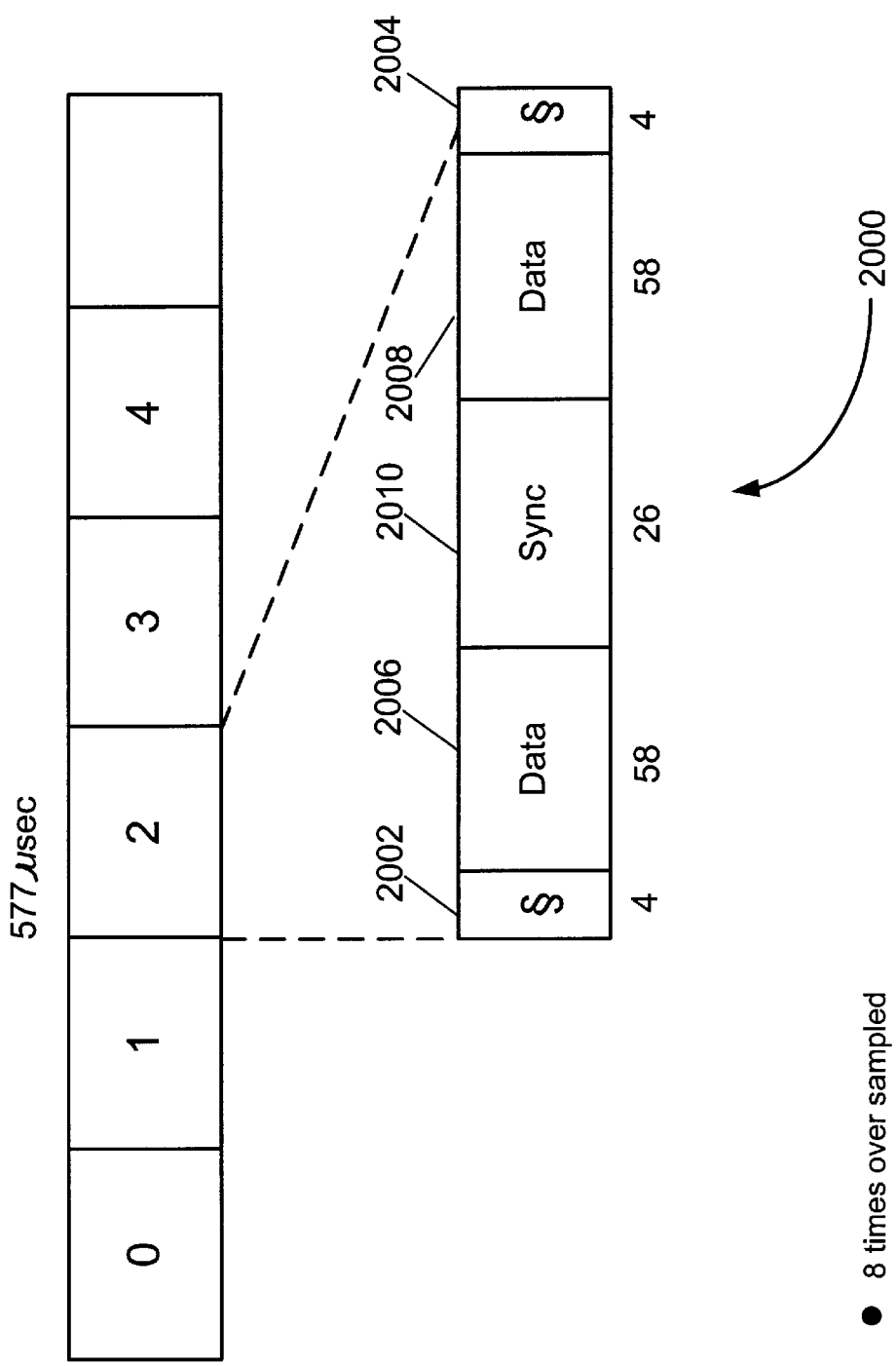
FIG. 21 is a timing diagram relating to a portion of the fourth preferred embodiment of the invention.

FIG. 19 is a first functional distribution diagram of a second version of the fourth preferred embodiment of the invention, and FIG. 20 is a second functional distribution diagram of a second version of the fourth preferred embodiment of the invention. FIG. 21 is a timing diagram relating to a portion of the fourth preferred embodiment of the invention.

As shown in FIG. 19, the second version 1800 of the fourth preferred embodiment of the invention includes a codec 1802 which receives audio signals from a headset (not shown). The output of the codec 1802 is sampled at 8 kHz and sent to a frame buffer 1804. The output of the frame buffer 1804 is then transmitted to a vocoder 1806 and next coded by a coder 1808. Next the bits produced by the coder 1808 are reordered in a reorder circuit 1810. Depending upon the class of the digital information produced by the reorder circuit 1810, the data are encoded in coding circuitry 1812 which includes a summer 1814, whose output is sent to an interleaving RAM 1816. The interleaving RAM 1816 also receives encoded information and frame stealing bits and produces yet another encoded stream of information which is presented to an encryption circuit 1818. The encryption circuit 1818 operates in connection with a key, is defined in a packet with a synchronization word in an adder circuit 1820, and then transmitted to an output buffer 1822, before it is transmitted.

FIG. 20 is a second functional distribution diagram of a second version 1900 of the fourth preferred embodiment of the invention. Data are received from a receiver (not shown) and sent to a buffer 1902. The data in the buffer 1902 are then sent to a de-interleaving RAM 1904 which produces a signal which activates a parity check circuit 1906, sends data to a buffer 1908, and also to a reorder bits circuit 1910. The data from the buffer 1908 is transmitted to a host, and the output from the reorder bits circuit 1910 is transmitted to a coded speech circuit 1912. The output from the coded speech circuit 1912 is transmitted to a vocoder 1914 and then to a frame buffer 1916. From the frame buffer 1916, the data is sent to a codec circuit 1918 and then transmitted to a headset (not shown).

FIG. 21 shows the functional form of a packet of data. A packet 2000 includes five fields. Beginning and ending fields 2002 and 2004 are each 4 units long, two data fields 2006 and 2008 are both 58 units long and a sync field 2010 is 26 units long.

Figure 22:
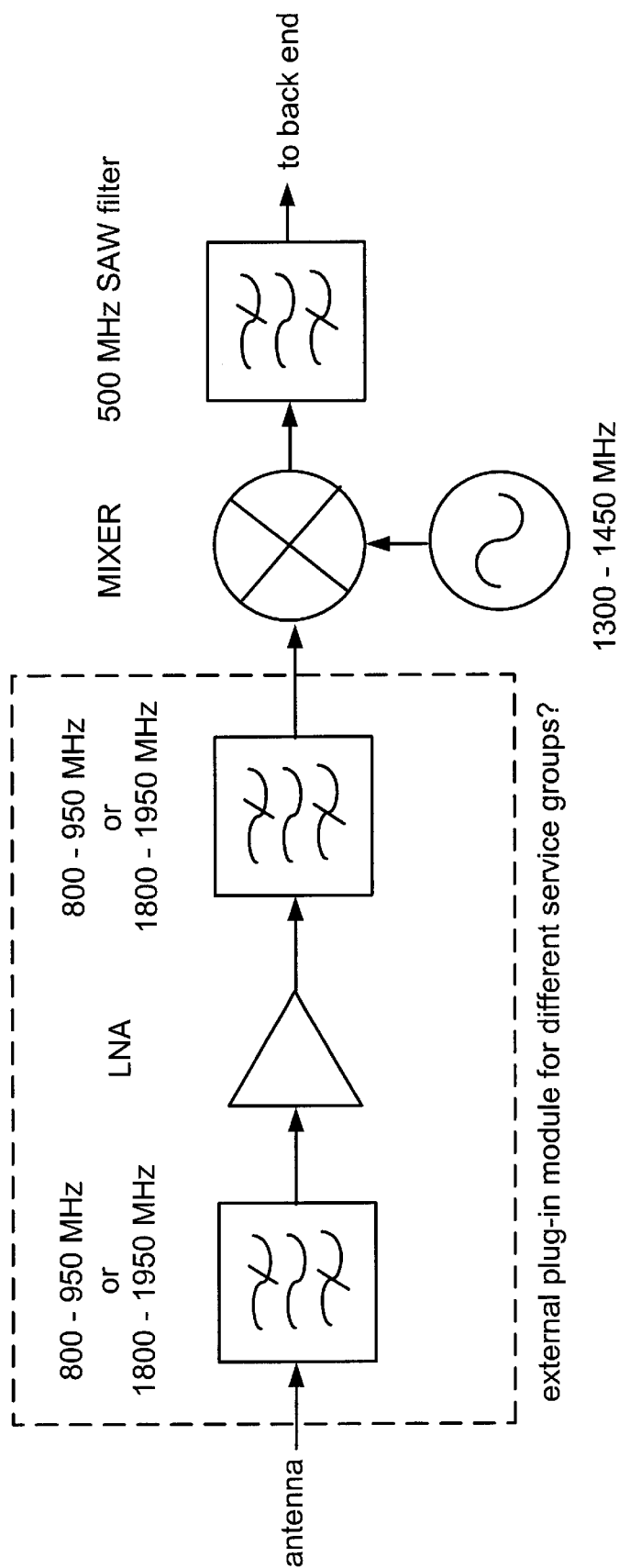
FIG. 22 is an architectural block diagram relating to a receiver portion of a fifth preferred embodiment of the invention.
Figure 23:
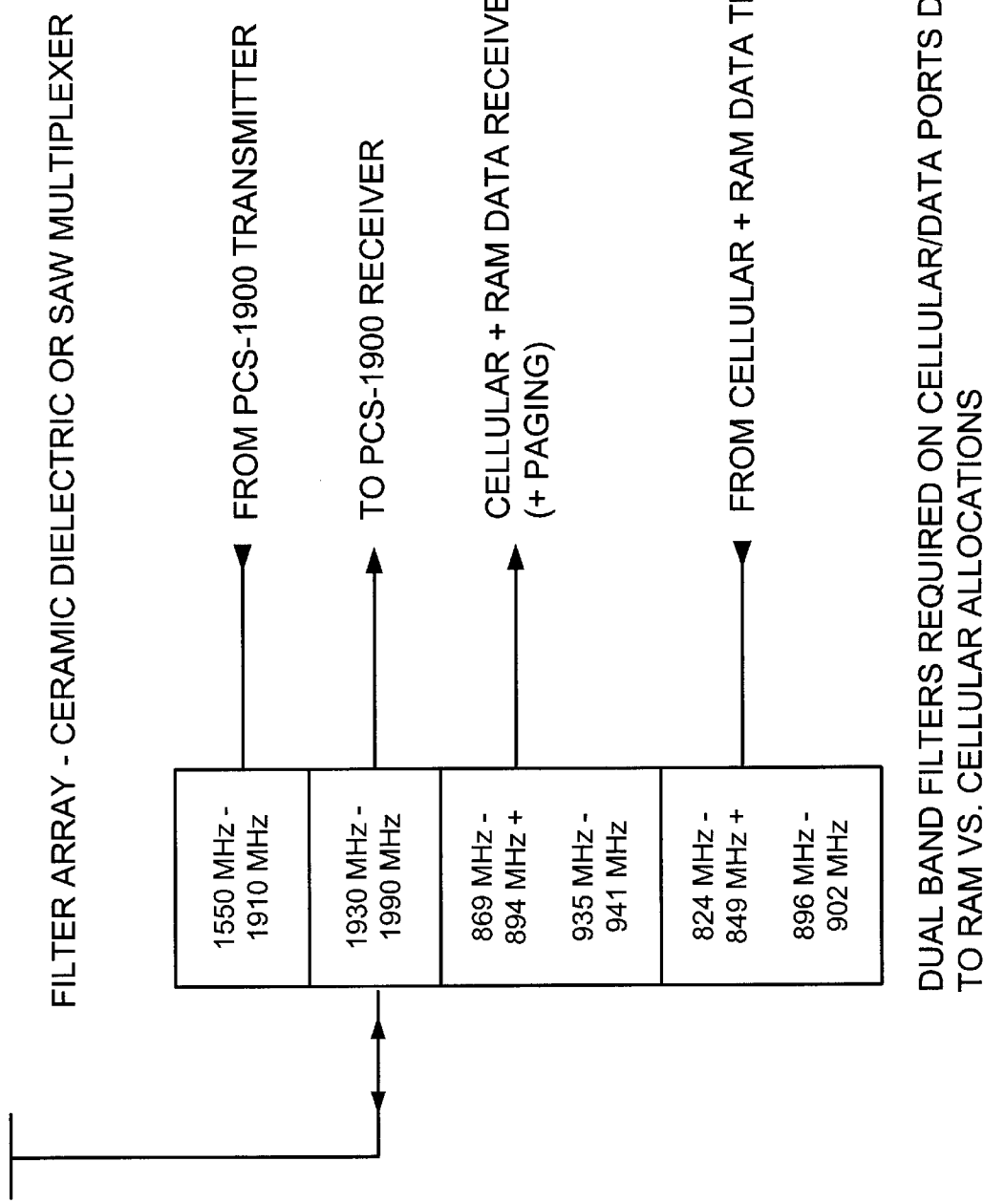
FIG. 23 is an architectural block diagram relating to an antenna and filter array portion of a fifth preferred embodiment of the invention.
Figure 24:
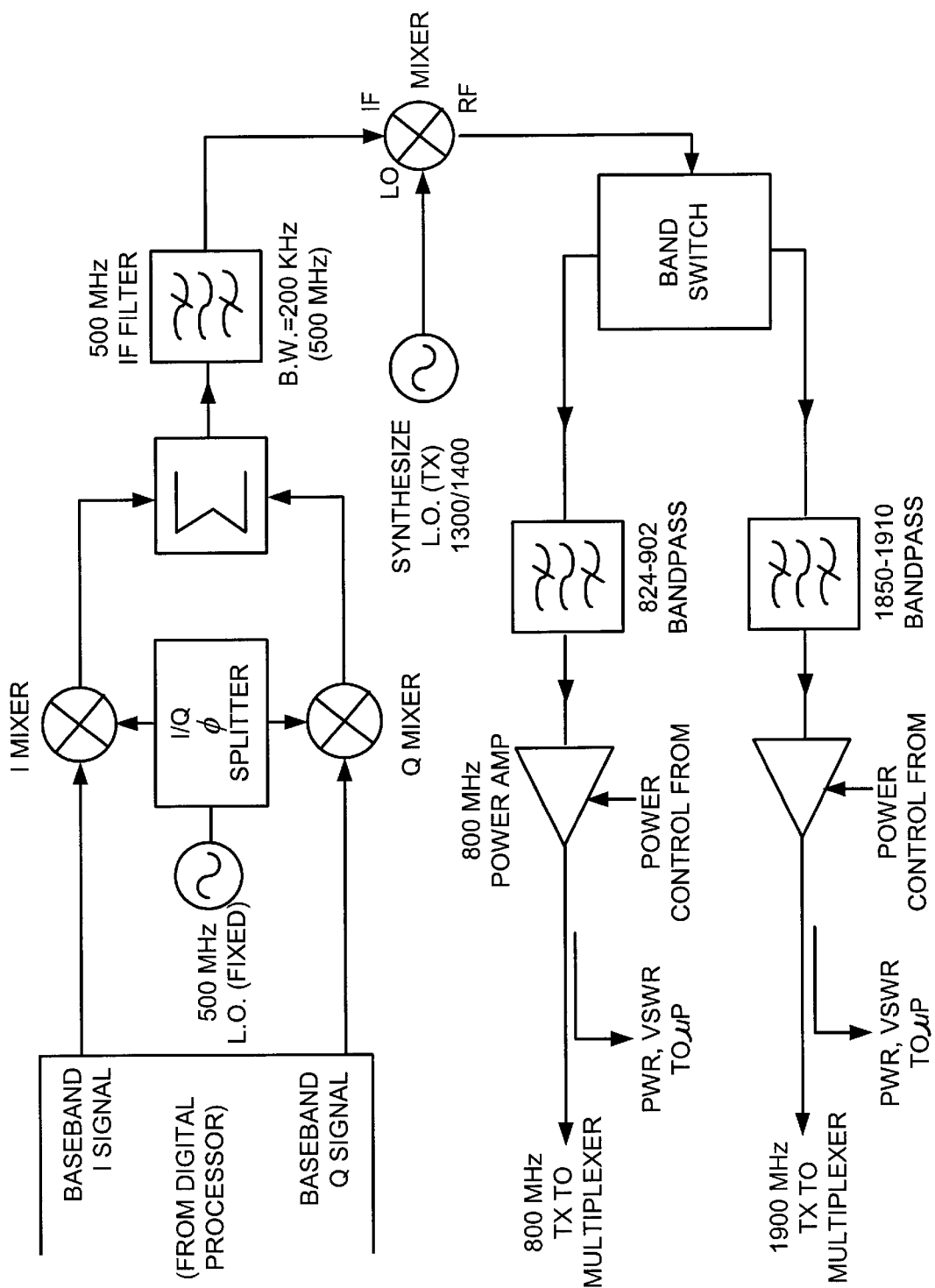
FIG. 24 is an architectural block diagram relating to a transmitter portion of a fifth preferred embodiment of the invention.
Figure 25:
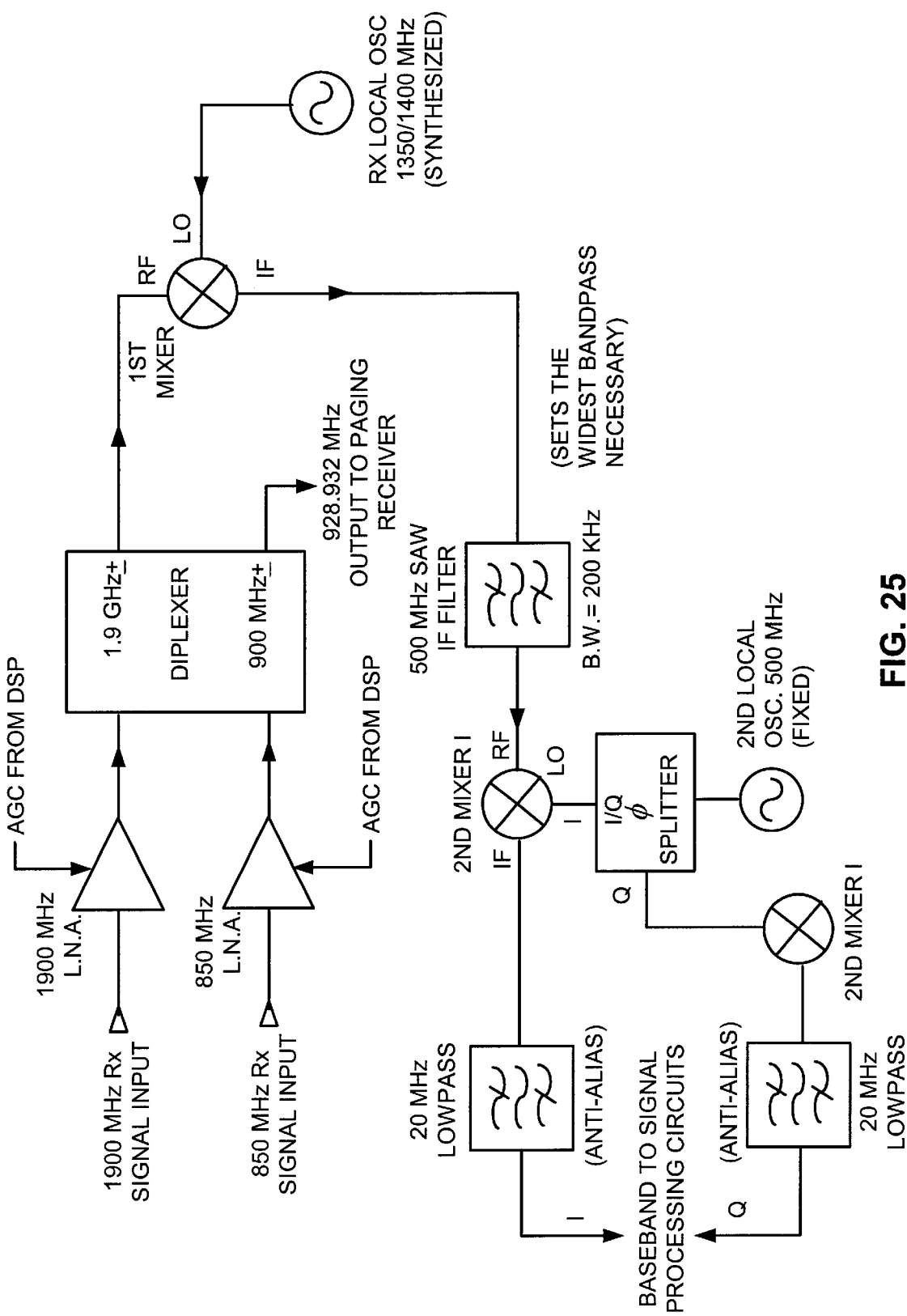
FIG. 25 is an architectural block diagram relating to a receiver portion of a fifth preferred embodiment of the invention.

FIG. 22 is an architectural block diagram relating to a receiver portion of a fifth preferred embodiment of the invention. FIG. 23 is an architectural block diagram relating to an antenna and filter array portion of a fifth preferred embodiment of the invention. FIG. 24 is an architectural block diagram relating to a transmitter portion of a fifth preferred embodiment of the invention, and FIG. 25 is an architectural block diagram relating to a receiver portion of a fifth preferred embodiment of the invention. Each of these diagrams will be understood by those skilled in the relevant arts.

Figure 26:
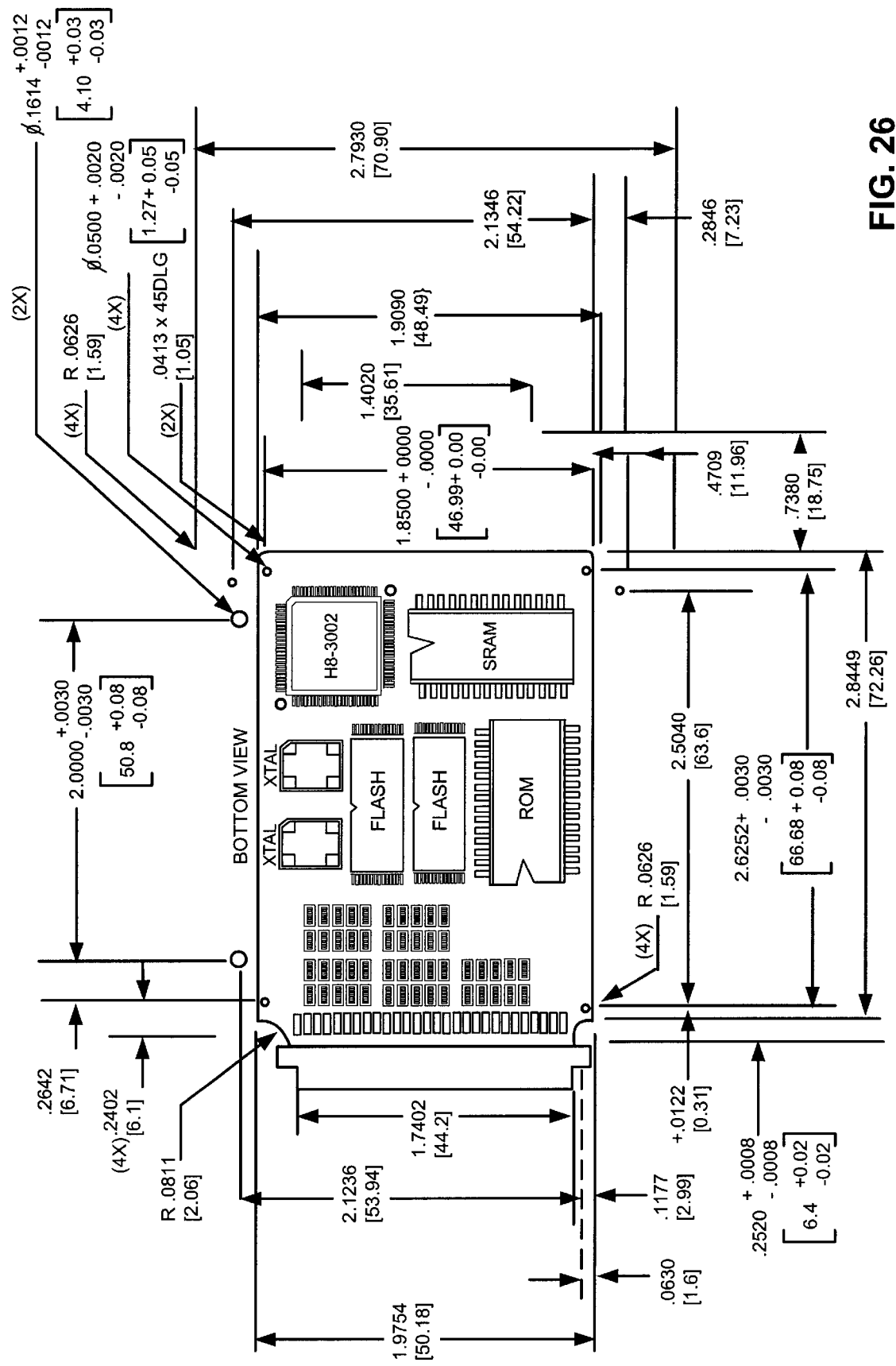
FIG. 26 is a first plan view of the architecture of the version of the second preferred embodiment of the invention shown in FIG. 9.
Figure 27:
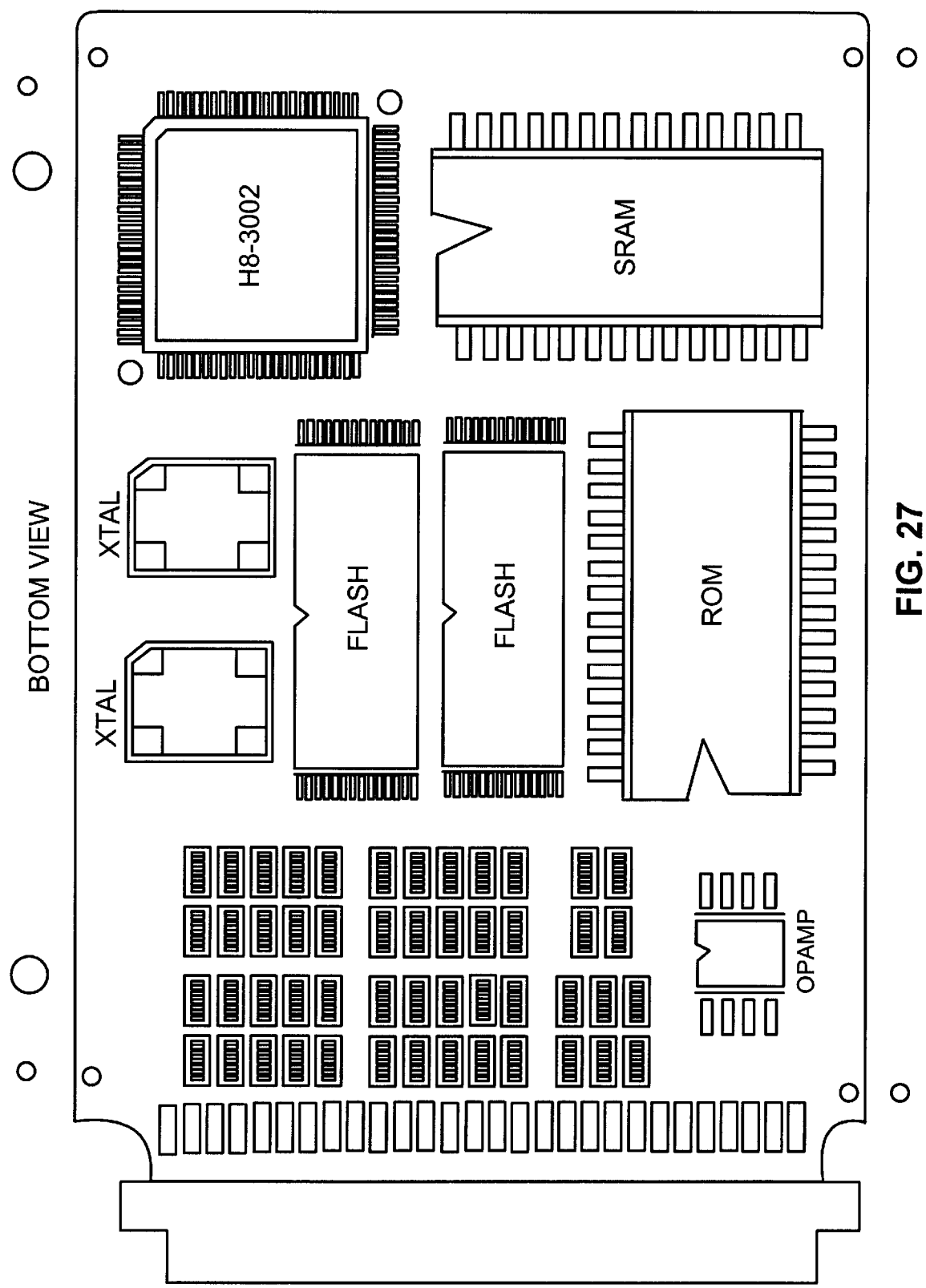
FIG. 27 is a second plan view of the architecture of the version of the second preferred embodiment of the invention shown in FIG. 9.
Figure 28:
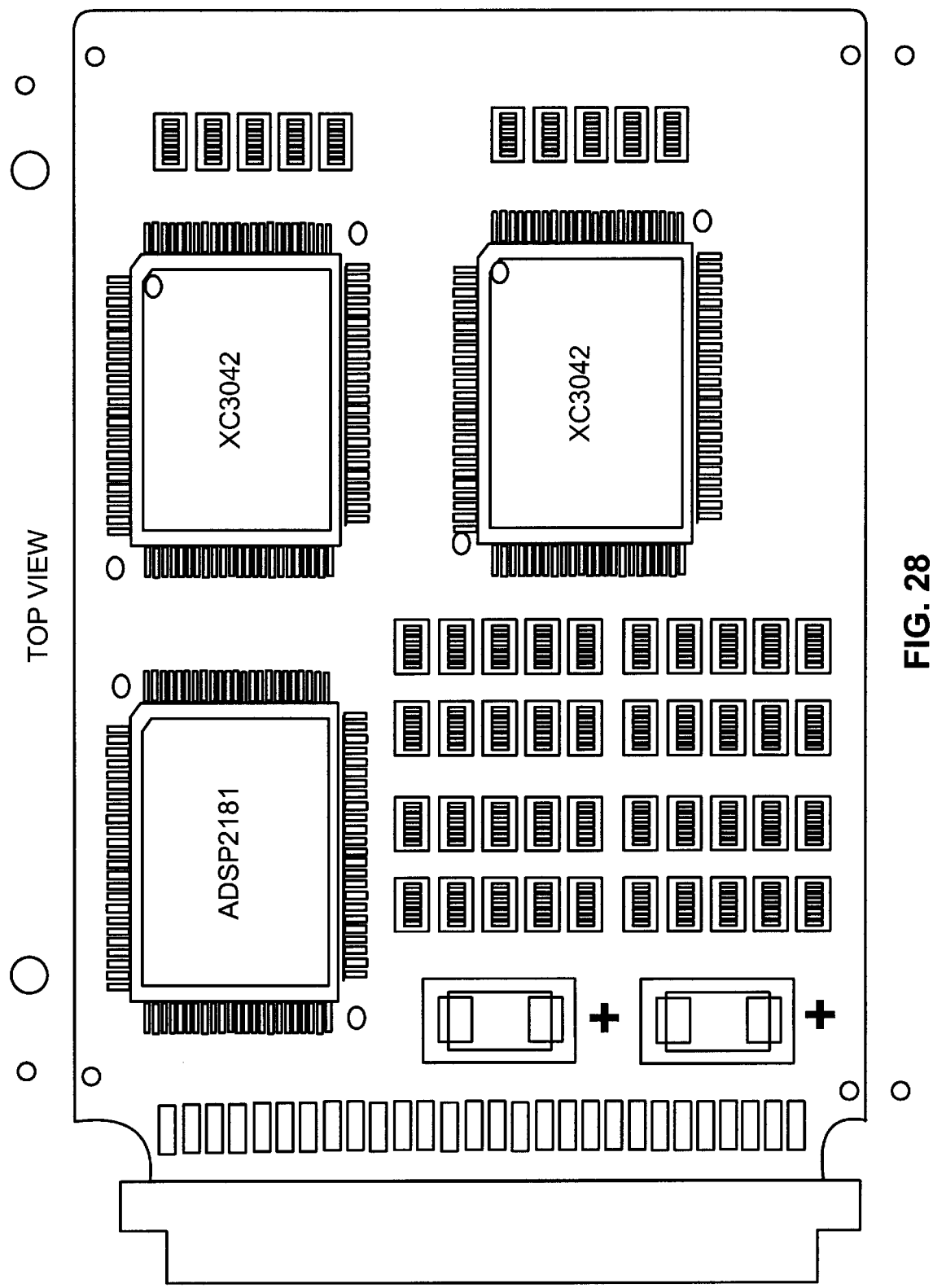
FIG. 28 is a third plan view of the architecture of the version of the second preferred embodiment of the invention shown in FIG. 9.

FIG. 26 is a first plan view of the architecture of the version of the second preferred embodiment of the invention shown in FIG. 9. FIG. 27 is a second plan view of the architecture of the version of the second preferred embodiment of the invention shown in FIG. 9. FIG. 28 is a third plan view of the architecture of the version of the second preferred embodiment of the invention shown in FIG. 9. Each of these diagrams will be understood by those skilled in the relevant arts.

FIG. 29 is a table showing anticipated modes of operation of the first, second, third, fourth and fifth embodiments of the invention.

Wherever possible, the controller code used with the various preferred embodiments is procured from of-the-shelf sources. Digital signal processing (DSP) functions are moved to a controller wherever possible. The advantages of the power management facilities of chips used are taken at every reasonable opportunity with the various embodiments. This power management can further take the form of modules to control power consumption in other parts of the system. The controller generally contains state machines, takes advantage of packetization whenever possible, and has a well-designed user interface, using the. skills known to those who are skilled in the art.

The field programmable gate arrays (FPGAs) use oversampled analog-to-digital (A/D) and digital-to-analog (D/A) conversion using Σ-Δtechniques.

The system also has a direct memory access for transfer of data with the digital signal processing circuit of the system. In the preferred embodiments, a PCMCIA I/O device can be used.

Among the purposes for the analog hardware used in any of the preferred embodiments shown in the Figures, key factors are to provide high power efficiency (which will maximize battery life), to provide wide dynamic range, and to provide excellent adjacent channel and intermodulation rejection.

In the hardware, the DSP function can be provided by an ADI 2181 chip, operating at 33 MIPs (at the current maximum clock rate). If a vocoder is desired, it can operate at 3.3 MIPs. Modem functions are provided at not greater than 20 MIPs. The hardware embodiment can be designed to be easy to program, and has a good power consumption profile. The controller in the hardware can be a Hitachi H8 chip, which features low power consumption and an available code. The use of field programmable gate arrays (FPGAs) delivers the required functionality while also having a good power consumption profile. The hardware components are readily available from common commercial sources, including Xilinx 3042L-125 FPGAs, and an Analog Devices ADSP2181 DSO chip. Static RAM (SRAM) can have a capacity of 128 kbytes. Appropriate battery capacity is 1300 mAH.

The power consumption that results in transmission of 0.6W RF energy is 1.5 W for an analog system. For a digital system, the FPGAs consume 70 mW, the H8 microcontroller consumes 75 mW, and the DSP consumes 80 mW. In the standard voice mode, the battery life is 3 hours talk time and 18 hours standby time. In the pager wake-up mode, the battery will work for one month (with 8 short transactions/day, 5 days/week). Time to switch from one service to another is currently 31 ms.

While the foregoing is a detailed description of the preferred embodiment of the invention, there are many alternative embodiments of the invention that would occur to those skilled in the art and which are within the scope of the present invention.

What is claimed is:

1. Apparatus for using electromagnetic radiation to communicate with a user in accordance with any one or more of a plurality of predetermined communications protocols, and in accordance with any one or more of a plurality of predetermined communications services, comprising:

a protocol circuit to establish the one or more predetermined communications protocols and generate a protocol signal representative of the one or more predetermined communications protocols established;

a service circuit to establish the one or more predetermined communications services and generate a service signal representative of the one or more predetermined communications services established; and a radio frequency circuit to receive the protocol signal and the service signal and respond to the protocol signal and the service signal by configuring itself to respond to radio frequency signals in compliance with the one or more predetermined communications protocols and the one or more predetermined communications services.

2. The apparatus of claim 1, wherein the radio frequency circuit is a radio frequency receiver adapted to receive the electromagnetic radiation and produce signals for the user in compliance with at least one of the one or more predetermined communications protocols and with at least one of the one or more predetermined communications services.

3. The apparatus of claim 1, wherein the radio frequency circuit is a radio frequency transmitter adapted to transmit the electromagnetic radiation in compliance with at least one of the one or more predetermined communications protocols and with at least one of the one or more predetermined communications services.

4. A method for using electromagnetic radiation to communicate with a user in accordance with any one or more of a plurality of predetermined communications protocols, and in accordance with any one or more of a plurality of predetermined communications services, the method comprising the steps of:

a) providing a radio frequency circuit;

b) establishing the one or more predetermined communications protocols;

c) generating a protocol signal representative of the one or more predetermined communications protocols established;

d) establishing the one or more predetermined communications services;

e) generating a service signal representative of the one or more predetermined communications services established;

f) receiving the protocol signal and the service signal; and g) responding to the protocol signal and the service signal by configuring the radio frequency circuit to respond to radio frequency signals in compliance with the one or more predetermined communications protocols and the one or more predetermined communications services.

5. The method of claim 4, wherein the radio frequency circuit established in step a) is a radio frequency receiver adapted to receive the electromagnetic radiation, the method further comprising the step of:

g) producing signals for the user in compliance with at least one of the one or more predetermined communications protocols and with at least one of the one or more predetermined communications services.

6. The method of claim 4, wherein the radio frequency circuit established in step a) is a radio frequency transmitter adapted to transmit the electromagnetic radiation, the method further comprising the step of:

g) transmitting the electromagnetic radiation in compliance with at least one of the one or more predetermined communications protocols and with at least one of the one or more predetermined communications services.

7. Apparatus for using electromagnetic radiation to communicate with a user in accordance with any one or more of a plurality of predetermined communications protocols, and in accordance with any one or more of a plurality of predetermined communications services, comprising:

radio frequency circuit means;

protocol establishment means for establishing the one or more predetermined communications protocols;

protocol signal means for generating a protocol signal representative of the one or more predetermined communications protocols established;

service establishment means for establishing the one or more predetermined communications services;

service signal means for generating a service signal representative of the one or more predetermined communications services established;

receiver means for receiving the protocol signal and the service signal; and electromagnetic radiation response means for responding to the protocol signal and the service signal by configuring the radio frequency circuit means to respond to radio frequency signals in compliance with the one or more predetermined communications protocols and the one or more predetermined communications services.

8. The apparatus of claim 7, wherein the radio frequency circuit means is a radio frequency receiver adapted to receive the electromagnetic radiation, the apparatus further comprising signal production means for producing signals for the user in compliance with at least one of the one or more predetermined communications protocols and with at least one of the one or more predetermined communications services.

9. The method of claim 7, wherein the radio frequency circuit means is a radio frequency transmitter adapted to transmit the electromagnetic radiation, the apparatus further comprising signal transmitter means for transmitting the electromagnetic radiation in compliance with at least one of the one or more predetermined communications protocols and with at least one of the one or more predetermined communications services.

* * * * *